(12) United States Patent
Rangan et al.

(10) Patent No.: US 11,838,193 B1
(45) Date of Patent: Dec. 5, 2023

(54) REAL-TIME LOAD LIMIT MEASUREMENT FOR A PLURALITY OF NODES

(71) Applicant: Amazon Technologies, Inc., Seattle, WA (US)

(72) Inventors: Rohit Rangan, Seattle, WA (US); David Yamanoha, Albuquerque, NM (US); Terence Smith, Bremerton, WA (US); Paul Derek DeMarco, Marathon, FL (US); Paul Walker Mooring, Seattle, WA (US); Zachary Wiggins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/082,967

(22) Filed: Dec. 16, 2022

(51) Int. Cl.
*H04L 43/062* (2022.01)
*H04L 43/0882* (2022.01)
*H04L 43/0817* (2022.01)

(52) U.S. Cl.
CPC ........ *H04L 43/062* (2013.01); *H04L 43/0817* (2013.01); *H04L 43/0882* (2013.01)

(58) Field of Classification Search
CPC ............... H04L 43/062; H04L 43/0817; H04L 43/0882; H04L 67/1031
See application file for complete search history.

(56) References Cited

U.S. PATENT DOCUMENTS

| | | | |
|---|---|---|---|
| 9,116,752 B1* | 8/2015 | Petit-Huguenin | H04L 67/51 |
| 10,055,262 B1* | 8/2018 | Thomas | G06F 9/5083 |
| 11,245,628 B1* | 2/2022 | Smith | H04L 43/062 |
| 11,381,639 B1* | 7/2022 | Smith | H04L 67/1001 |
| 2015/0358236 A1* | 12/2015 | Roach | H04L 47/22 370/235 |
| 2018/0054477 A1* | 2/2018 | Chivukula | H04L 67/1008 |
| 2020/0050485 A1* | 2/2020 | Anderson | H04L 47/125 |
| 2020/0280750 A1* | 9/2020 | Nakamura | H04L 65/764 |

* cited by examiner

*Primary Examiner* — Jerry B Dennison
(74) *Attorney, Agent, or Firm* — Kilpatrick Townsend & Stockton LLP

(57) ABSTRACT

A first node can be selected as a target node, and a second node can be selected as a control to determine a performance limit associated with providing a service. A request for the service can be determined to be routed to the first node. A first indication of a first performance measurement associated with processing a first load by the first node can be received. A second indication of a second performance measurement associated with processing a second load by the second node can be received. A performance error of the first node can be determined based on the first performance measurement and the second performance measurement. The performance limit can be determined based on the performance error, and an action can be triggered based on the performance limit.

20 Claims, 14 Drawing Sheets

REAL-TIME LOAD LIMIT MEASUREMENT FOR A PLURALITY OF NODES

BACKGROUND

Some load balancers, such as node selectors, manage load across a fleet of servers by routing requests to a server that is currently serving the smallest number of requests (e.g., least-request load balancers). The maximum number of requests that a server can handle may also be predefined. When routing the requests to that server, the routing may account for the maximum number such that this number is not exceeded. Often, design assumptions are made to predefine the maximum number and, as such, this maximum number may not accurately reflect the actual maximum capacity of the server given the actual operational context. For some systems, the maximum capacity can also fluctuate over time. As such, in such systems, using a predefined maximum number may not result in an optimized load balance distribution.

BRIEF DESCRIPTION OF THE DRAWINGS

Various embodiments in accordance with the present disclosure will be described with reference to the drawings, in which.

DETAILED DESCRIPTION

Figure 1:
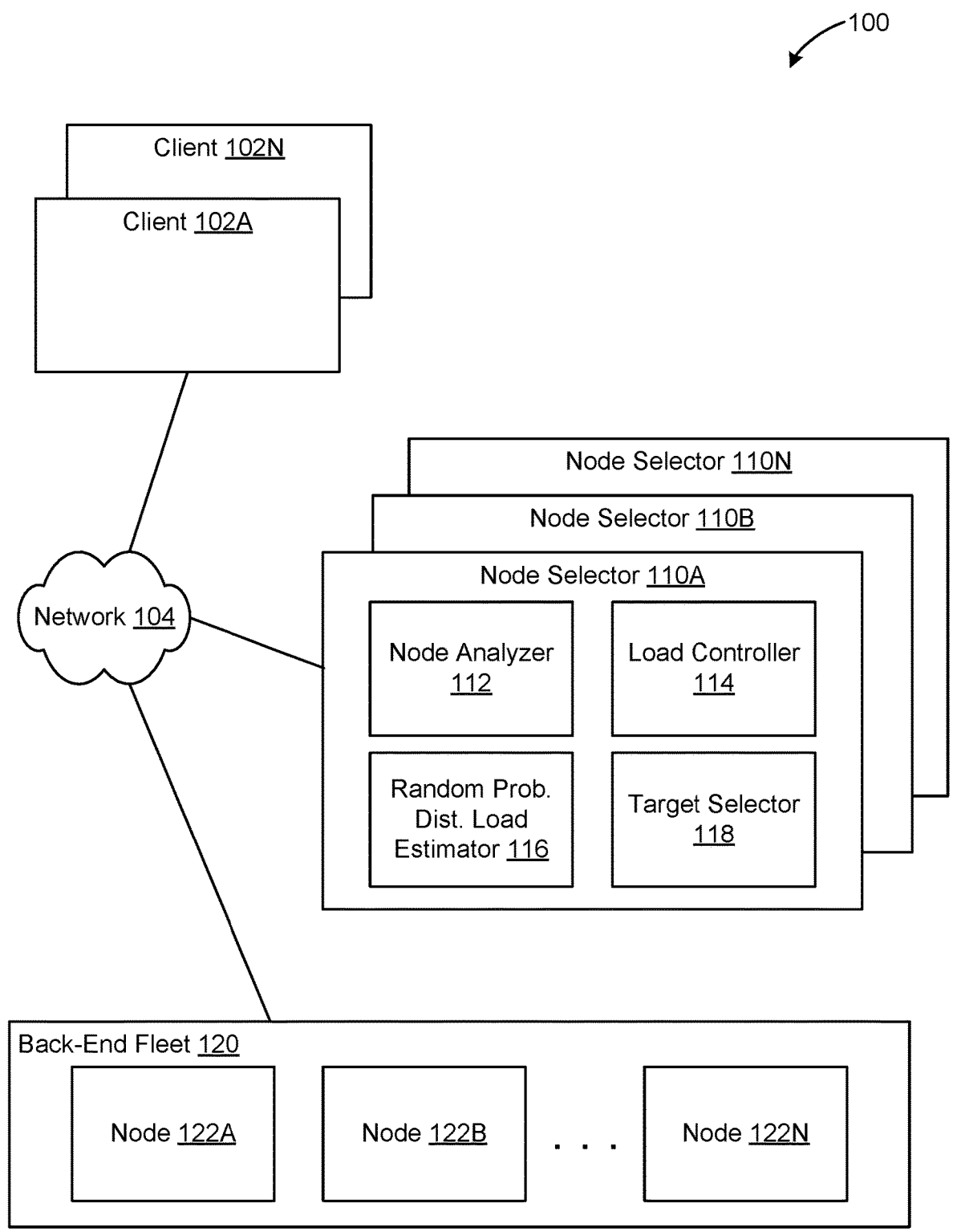
FIG. 1 illustrates a block diagram of a system for determining performance limits of nodes, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, load limit measurements for a plurality of nodes. Such measurements can be performed in real-time, in a continuous manner to account for fluctuation in a maximum capacity for nodes without the need for a priori design assumption that quantifies the maximum capacity. In the present disclosure, performing such measurements can be referred to continuous service performance testing (CSPT).

In an example, a system that can perform CSPT includes (i) a computer system with a set of nodes, such as computer servers, for providing a service, and (ii) a node selector. The node selector can be a compute node that determines, based on a performance requirement, such as a maximum latency, associated with providing the service, a configuration indicating a type of performance measurements to report to the node selector. The node selector requests, based on the configuration, at least a first node and a second node of the computer system to send load reports to the node selector (e.g., such that each node reports its latency periodically). The node selector selects the first node as a target and at least the second node as a control to determine a performance limit that indicates a maximum load that can be processed within a unit of time while meeting the performance requirement. The node selector may select additional nodes of the computer system to be control nodes. The first node is to handle a larger load than the second node based on the first node being selected as the target and the second node being selected as the control. The node selector receives a set of client requests for the service, and the node selector sends first client requests of the set of client requests to the first node based on the first node being the target. The first client requests correspond to a first load. The node selector sends second client requests of the set of client requests to the second node. The second client requests correspond to a second load that is smaller than the first load. The node selector receives, from the first node, a first load report indicating a first performance measurement, such as a latency, associated with processing of the first load by the first node. The node selector receives, from the second node, a second load report indicating a second performance measurement associated with processing of the second load by the second node. The node selector determines, based on the first load report and the second load report, a performance error of the first node relative to the performance requirement. The node selector determines the performance limit, such as a maximum transactions per second (TPS) to meet the latency requirement, based on the performance error. The node selector triggers an action based at least in part on the performance limit.

To illustrate, consider an example of a fleet of web servers hosting a web service on behalf of an entity. The web servers may be communicatively coupled with a node selector that can receive and route client requests for the web service to the web servers in a distributed manner for load balancing purposes. A service level agreement (SLA) may exist and may indicate a requirement defined at least in part by the entity for a maximum acceptable latency to process and respond to a client request for the web service. The node selector may implement CSPT techniques to determine whether the requirement is met or not and/or to trigger an action for managing the fleet (e.g., to scale it up or down).

In particular, the node selector can select a first web server of the fleet as a target node. Additionally, the node selector can select, as control nodes, other web servers of the fleet of the same type as the first web server. Given that a latency requirement is defined, the node selector can send configuration data to the web servers indicating that each should report a latency histogram every few seconds. Initially, the node selector may evenly distribute incoming client requests to the web servers and periodically receive reports back from the web servers. Next, the node selector can increase the load of the first web server (e.g., the target node) by sending it a larger volume of incoming client requests relative to the other web servers. Here also, the node selector may receive the reports back and may determine the impact of the larger load, such as by comparing the latency histogram of the first web server to an average (or some statistical measure) of the latency histograms of the other web servers to determine a difference (e.g., a variance, a deviation, etc.). If the impact is minimal (e.g., the difference is less than a threshold amount), the node selector can further increase the load allocated to the first web server. This load increase-impact determination can be iteratively repeated until the node selector detects that the impact is significant (e.g., now the difference exceeds the threshold amount). In this case, the reported latency of the first web server can be compared to the maximum latency. If it exceeds the maximum latency, the node selector determines a violation of the SLA. Otherwise, the node selector can further increase the load allocated to the first web server until the violation is detected. At that point, the node selector significantly decreases the load allocated to the first web server by reducing the number of the incoming client requests to send to the first web server. The load that was achieved prior to the violation corresponds to the maximum number of client requests that the first web server can handle within a time unit (e.g., a maximum transaction per second (TPS)). This TPS be set as the maximum capacity that the web servers (all being of the same type) can handle. Any load distribution can be compliant with the maximum TPS. This maximum TPS can be continuously measured and updated over time such that the maximum capacity can be dynamically determined. Furthermore, depending on a forecasted volume of client requests, the fleet can be scaled up or down. For instance, if the forecast indicates that the maximum TPS is insufficient to process the forecasted volume while meeting the maximum latency requirement, a web server can be added to the fleet.

Embodiments of the present disclosure may provide technical improvements over conventional techniques for optimization of computer nodes. For example, the need for design assumptions and predefining capacities can be eliminated. Instead, capacities can be dynamically or more accurately determined, thereby enabling better load balancing and distribution and better scaling up or down of computer systems.

FIG. 1 illustrates a block diagram of an architecture 100 for determining performance limits of nodes 122, according to an embodiment of the present disclosure. As illustrated, the architecture 100 includes client computing devices 102A through 102N (which can be generally referred to as clients 102), a network 104, node selectors 110A through 110N (which can be generally referred to as node selectors 110), and a back-end fleet 120. The back-end fleet 120 can include nodes 122 through 122N (which can be generally referred to as nodes 122 or back-end nodes 122) configured to provide a service (e.g., a web service). Generally, each one of the node selectors 110 can be configured to implement CSPT techniques for measuring a performance limit for at least a subset of the nodes 122, continuously, in real-time. A node selector 110 can do so by selecting a node 122 of a certain type as a target, iteratively allocating a load to this node 122 and measuring its impact to a performance of the target relative to other nodes 122 of the same type (used as controls), until a performance limit is determined that would meet a requirement.

In an example, a performance limit of a node 122 represents a maximum capacity of the node 122 for handling a load. The load can be requests to the node 122, responses from the node 122, and/or any other type of traffic to and/or from the node 122. The maximum capacity can be defined in different terms, such as a maximum number of requests for the service that the node 122 can handle within a time unit (e.g., a maximum TPS), a maximum, number of concurrent connections that the node 122 can establish with clients 102, etc. A requirement can be defined at least in part by an entity that is associated with the service, such as in an SLA, and can be a performance requirement (e.g., acceptable processing latency, minimum number of concurrent connections, minimum volume of traffic to be handled, etc.).

In some embodiments, the network 104 may be or otherwise include a wide area network (WAN), such as the Internet, a local area network (LAN), or any other type of network that can connect the clients 102, the node selectors 110, the nodes 122, and the like. For example, the network 104 may facilitate data transfer originating and/or terminating at a client 102, a node selector 110, and/or a node 122.

A client 102 can be a computing device that includes one or more processors and one or more memory storing instructions executable by the one or more processors to configure the client 102 to perform various operations. These operations, for example, transmitting a request for a service to be performed by the back-end fleet 120, or one or more nodes 122 thereof. The client 102 can transmit such a request directly or indirectly via a node selector 110, whereby the request is processed by a node 122. A result of the processing can be sent from the node 122 back to the client 102 directly or indirectly via the node selector 110. Different techniques for routing requests and responses are further described in the next figures.

In an example, a node selector 110 can be a compute node, such as one implemented as a hardware computer and/or as a virtualized instance executed by a hardware computer. The node selector 110 can be configured to provide different types of services including the distribution of loads (e.g., requests or transactions that need to be processed) to the nodes 122. For a node 122, the node selector 110 may determine a target load that the node 122 should handle. In other words, the node selector 110 can be configured as a load balancer or a load distributor. Optionally, the node selector 110 can direct the underlying traffic to the node 122 (e.g., by being configured as a router). a Each node selector 110 may include a node analyzer 112, a load controller 114, a random probability distribution load estimator 116, a target selector 118, and any other component for facilitating functions of the node selector 110, including CSPT-related functions. In some embodiments, the node analyzer 112 may analyze load information received from one or more of the nodes 122, for example in the form of load reports. The load controller 114 may be configured to make decisions about loads for the nodes 122. For example, the load controller 114 can incrementally increase the load of a target node until its performance limit is determined and decrease (e.g., exponentially or in a different manner) the load upon a violation of a requirement. The random probability distribution load estimator 116 may determine estimates of load on each of the nodes 122 and/or may process load reports of the nodes to using statistical measures (e.g., to determine an average performance distribution of control nodes, to determine a variance of the performance distribution of the target node relative to the average performance distribution, etc.). The target selector 118 can be executed by the node selector 110 to select a node 122 as the target as part of the CSPT. This selection can be based on various factors, such as the type of the node 122. Although the components 112-118 of the node selector 110 are illustrated as being separate components, some or all of these components can be implemented as a single component. For example, functionalities of the random probability distribution load estimator 116 can be implemented by the load controller 114.

CSPT may be implemented as a service by the node selectors 110 for reporting the peak load of a requested service as load patterns shift throughout the days, weeks, months, etc. CSPT can be achieved by stressing a fraction of the nodes 122 (e.g, target nodes, also referred to herein as CSPT hosts) to run at respective peak utilizations continuously by directing a larger portion of traffic to these target nodes. Different control algorithms can be used. A first algorithm may be a feedback control algorithm that maintains a target node at a target load level. A second algorithm may be a congestion control algorithm that determines this target load level. The feedback control algorithm can use the difference in current load levels of the target and a control node(s) that need to be maintained as input to a proportional controller (e.g., the load controller 114). The output of the control algorithm results in increasing or decreasing the "weight" of the target node relative to other nodes, which can allow a load balancing algorithm to increase or decrease the proportion of requests to the target node.

Telemetry, in the form of latency histograms and response status, can be continuously gathered from all nodes. The telemetry can be processed to form a probability distribution of errors, one for the target node and one for the remaining control nodes. These probability distributions are compared to check whether the target node's errors are significantly larger than the control nodes. The congestion control algorithm can be used to increase or decrease load levels depending on the results of the distribution comparison check. The congestion control algorithm can allow adaptation to change in load characteristics of a service while preventing congestive collapse of the target node. These and other functionalities are further described herein below.

Figure 2:
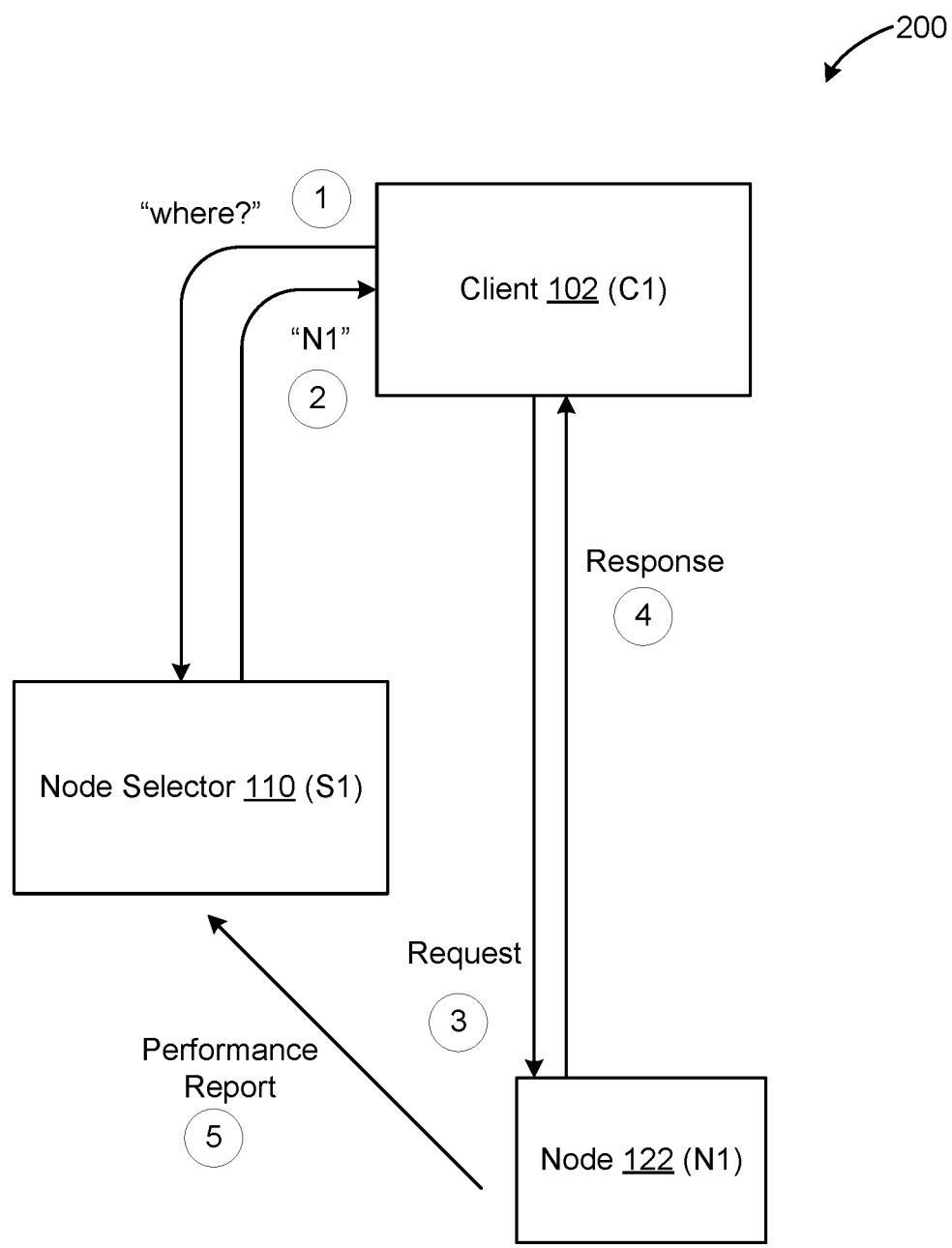
FIG. 2 illustrates a non-proxy architecture, according to an embodiment of the present disclosure.

FIG. 2 illustrates a non-proxy architecture 200, according to an embodiment of the present disclosure. The architecture 200 includes some of the components described in connection with FIG. 1, such as a client 102 (labeled as "C1"), a node selector 110 (labeled as "S1") and a node 122 (labeled as "N1"). Given the nature of the non-proxy architecture 200, the node selector S1 does not actually route requests to nodes and does not receive back responses from the nodes. As such, to measure a performance (e.g., latency) of a node, the node selector S1 can send configuration data (e.g., as a file) to the node, where this configuration data triggers the node to send performance reports (e.g., periodically send latency measurements such as in the form of latency histograms).

As illustrated, at event "1," the client C1 sends a routing request to the node selector S1 asking where to send a request to be processed by a node 122 of the back-end fleet 120. At event "2," the node selector S1 identifies N1 as the node to process the request and responds to the client C1 with information about the node N1 (e.g., the node identifier, network address, etc.). At event "3," the client C1 sends the request to the node N1 to be processed. At event "4," the node N1 processes the request and responds back to the client C1 with the response to the processing request. At event "5," the node N1 sends a performance report to the node selector S1. This performance report can include raw measurement data associated with processed requests (e.g., a measured latency for the processing of the request of the client C1) and/or a measurement performance associated with such requests (e.g., a latency histogram for a time window during which the requests were processed).

Figure 3:
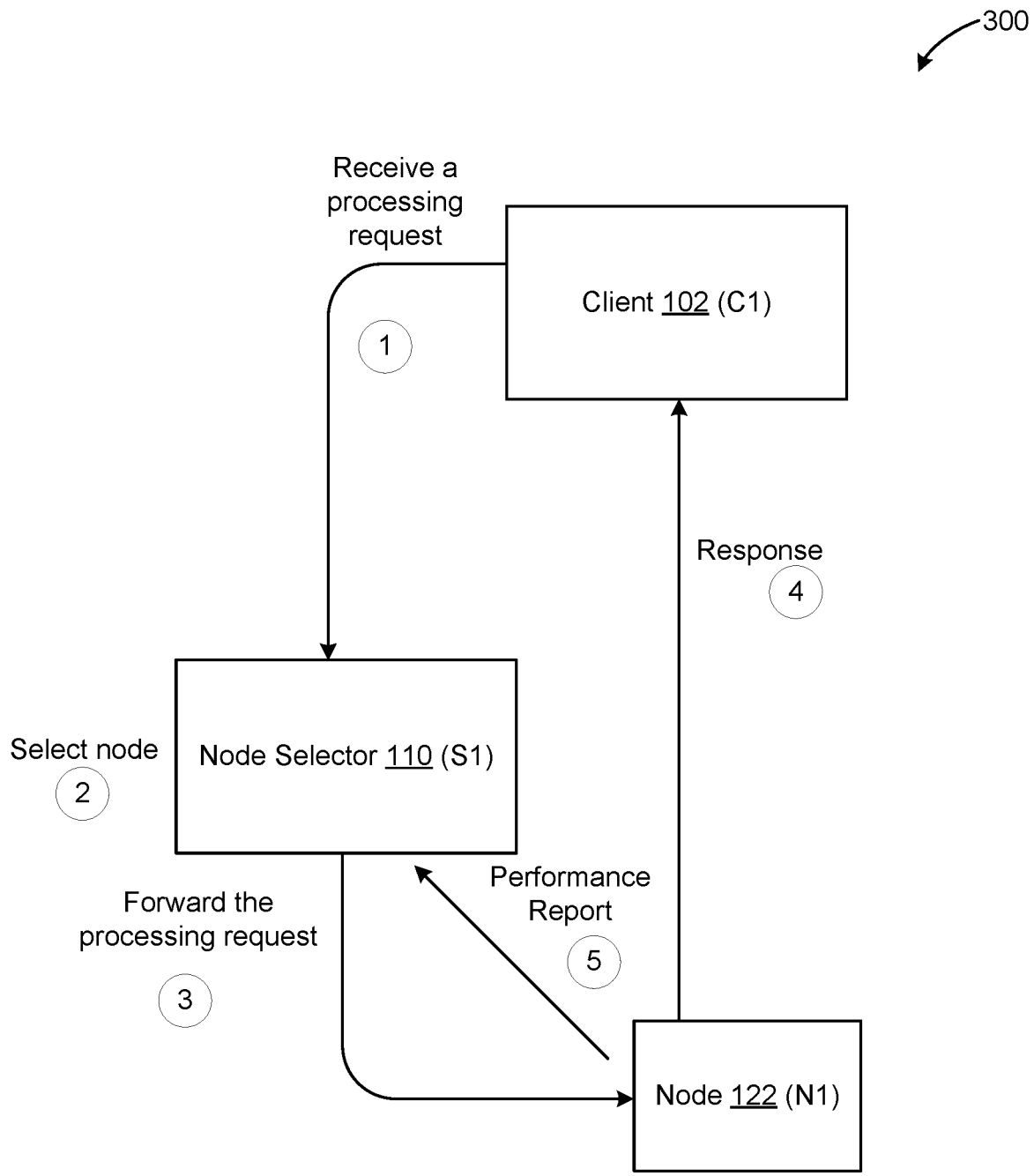
FIG. 3 illustrates an a non-proxying architecture employing a direct server return (DSR), according to an embodiment of the present disclosure.

FIG. 3 illustrates an architecture 300 with non-proxying request node selectors employing a direct server return (DSR), according to an embodiment of the present disclosure. In the architecture 300, although a node selector 110 (labeled as "S1") routes a request of a client 102 (labeled as "C1") to a node 122 (labeled as "N1"), the response of the node 122 is not sent back to the client 102 via the node selector 110 due to DSR. As such, and similar to the architecture 200 of FIG. 2, the node selector 110 can monitor a performance of the node 122 by configuring the node 122 (e.g., by sending it configuration data) to send performance reports.

As illustrated, at event "1," a processing request from the client C1 can be received for routing at the node selector S1. At event "2,", the node selector S1 can select the node N1 to process the request. At event "3," the node selector S1 can transmit the processing request to the selected node N1, that can process the request and respond, at event "4," to the client C1 directly (e.g., by not needing the response to be routed via the node selector S1). At event "5," the node N1 sends a performance report to the node selector S1. This performance report can include raw measurement data associated with processed requests (e.g., a measured latency for the processing of the request of the client C1) and/or a measurement performance associated with such requests (e.g., a latency histogram for a time window during which the requests were processed).

Figure 4:
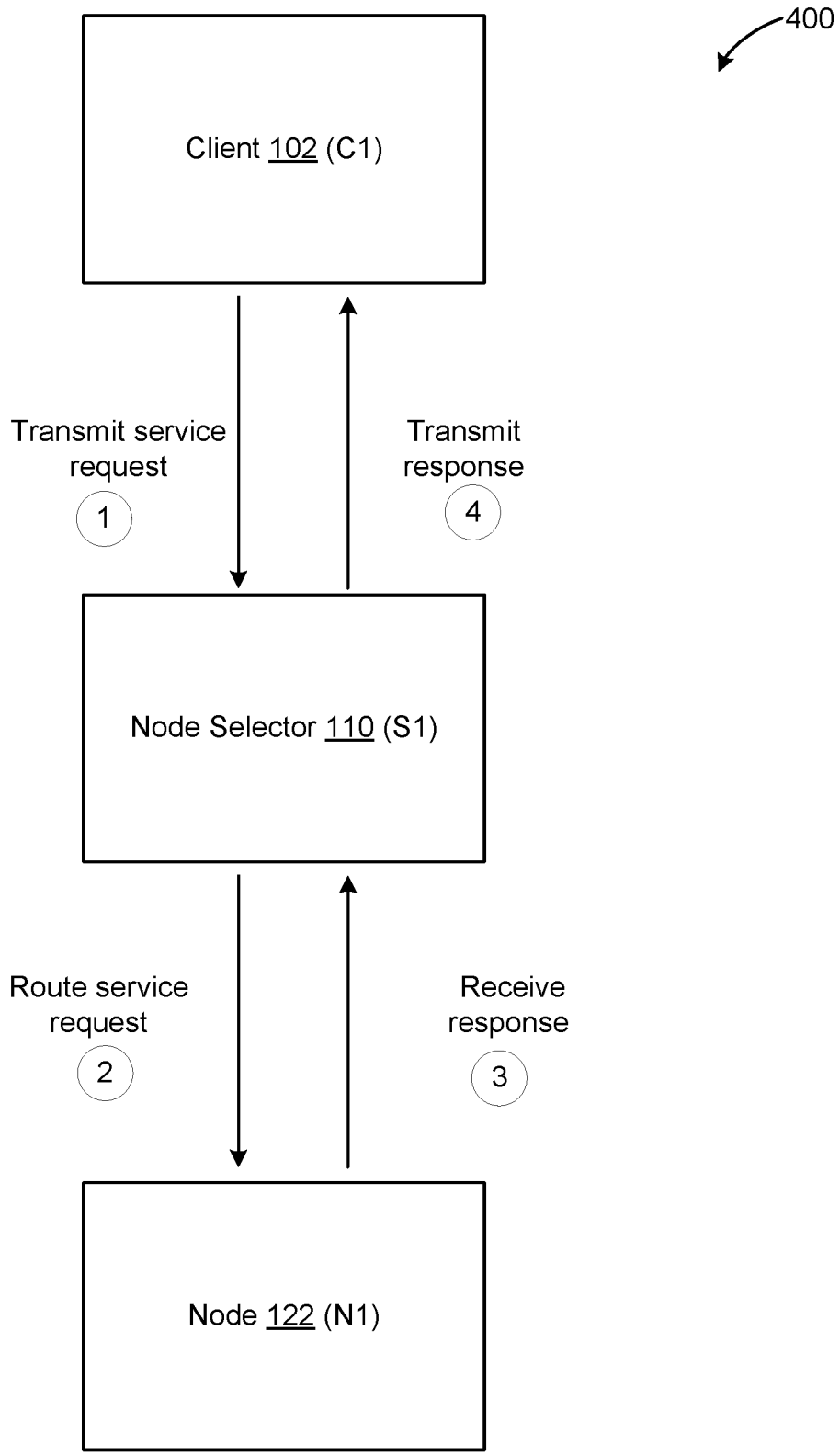
FIG. 4 illustrates a proxy architecture, according to an embodiment of the present disclosure.

FIG. 4 illustrates a proxy architecture 400, according to an embodiment of the present disclosure. Here, a node selector 110 (labeled as "S1") routes a request sent from a client 102 (labeled as "C1") to a node 122 (labeled as "N1") and the response of the node 122 to the client 102. Accordingly, the node selector 110 can itself derive performance measurements for the node 122 based on requests sent to the node 122 and responses received back from the node 122 and without the need for the node 122 to send performance reports to the node selector 110. In such an architecture, the use of configuration data may not be needed.

As illustrated, at event "1," the client C1 transmits a service request to the node selector S1. At event "2," the node selector 110 can receive the service request, select the node N1, and transmit the service request to the node N1. At event '3," the node N1 can process the request and transmit a response to the node selector S1. Next, at event "4," the node selector S1 transmits the response to the client C1.

The node selector S1 can maintain data about the sent service request and the received response. Similar data can be collected over time (e.g., during a time window) for all service requests and all responses, for all clients, and for all nodes. Performance measurements can be derived from such data.

For example and referring back to the service request sent to the node N1 and the response back of the node N1, the collected data can include a first timestamp of the timing when the service request was sent, and a second timestamp of the timing when the response was received. The difference between these two timestamps represents the processing latency of the node N1 with respect to this service request. The node selector S1 can similarly determine the processing latencies of the different requests handled by the node N1 during the time window to generate a latency histogram for the node N1.

For simplicity of description, and without limitation, latency, number of requests, and TPS are used herein next to describe various aspects of the embodiments of the present disclosure. However, the embodiments are not limited to such types of data and similarly and equivalently apply to any other types of data that can be monitored and processed to determine a performance limit of a node.

Figure 5:
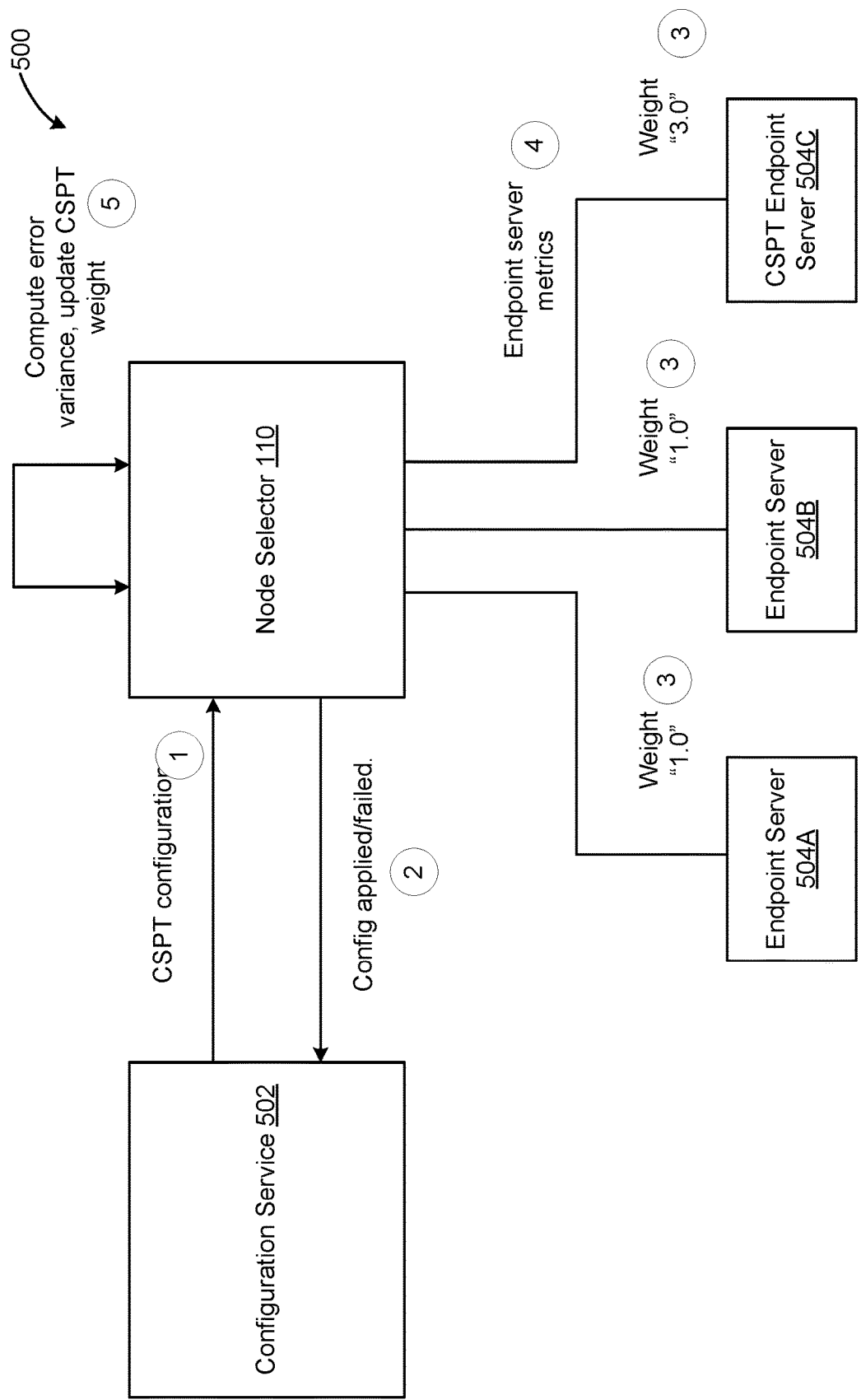
FIG. 5 illustrates a data flow diagram for a system that performs continuous service performance testing, according to an embodiment of the present disclosure.

FIG. 5 illustrates a data flow diagram for an architecture 500 that performs CSPT, according to an embodiment of the present disclosure. The architecture 500 includes a node selector 110, a configuration service 502 communicatively coupled with the node selector 110, a first endpoint server 504A communicatively coupled with the node selector 110, a second endpoint server 504B communicatively coupled with the node selector 110, and a CSPT endpoint server 504C communicatively coupled with the node selector 110. The configuration service 502 can be a component of a server configured to provide an interface (e.g., a web interface or an application programming interface (API)) usable by an entity to define requirements (e.g., as part of a SLA) for a service to be hosted on endpoint servers. A CSPT endpoint server can be an endpoint server configured to provide the service and selected by the node selector 110 as a target for the CSPT, such that a performance limit of the CSPT endpoint server can be determined. The CSPT endpoint server can be of a particular type. The performance limit can be associated with the particular type such that it can be assumed to also apply to any endpoint server of the same type and configured to provide the service. In the illustration of FIG. 5, the first endpoint server 504A, the second endpoint server 504B, and the CSPT endpoint server 504C are configured to provide the service and are of the same type, where the CSPT endpoint server 504C is the target node for the CSPT, and where the first endpoint server 504A and the second endpoint server 504B are the control nodes.

As illustrated in FIG. 5, the configuration service 502 can transmit a CSPT configuration to the node selector 110. For example, the configuration service 502 can generate the CSPT configuration from the requirements input by the entity. The requirements can indicate, for instance, a maximum latency. Given the CSPT configuration, the node selector 110 can generate configuration data indicating the type and/or cadence performance measurements and/or reports to be collected. Depending on whether a non-proxy routing architecture (as in FIGS. 2-3) or a proxy routing architecture (as in FIG. 4) is used, the configuration data can be sent to the endpoint servers 504A through 504C. Upon generating the configuration data and, as applicable, distributing it, the node selector 110 can indicate, to the configuration service 502, that the CSPT configuration was applied. Otherwise, a failure is indicated, which can trigger the configuration service 502 to collect additional input of the entity and/or change the CSPT configuration.

Assuming success, the node selector 110 can next select the CSPT endpoint server 503C as the target node for the CSPT and can control the load distribution to the endpoint servers 504A through 504C accordingly. This control can be effectuated by means of weights, for example, as part of a control loop. In particular, each endpoint server 504A through 504C is assigned a weight. When the same value is set for the weights, the load is evenly distributed among the endpoint servers 504A through 504C. When a weight of an endpoint server is set relatively larger than that of another endpoint server, the load to the former endpoint server is larger than that of the latter endpoint server.

In an example, all weights are initially set to a default value (e.g., "1"), indicating that each endpoint server 504A through 504C is to handle about the same load. Because the CSPT endpoint server 504C is set as the target node, its weight can be increased, while the weights of the endpoint servers 504A and 504B remain the same, thereby indicating that the CSPT endpoint server 504C is to handle a relatively larger load. In some examples, the target node's weight can stay the same while the control nodes have their weight decreased. In the illustration of FIG. 5, the weight of the CSPT endpoint server 504C is increased to "3," whereas the other weights remain at "1," thereby indicating that the CSPT endpoint server 504C is to handle roughly three times the amount of load than each of the endpoint servers 504A and 504B. A load can be a range of requests that need to be handled by an endpoint server during a time interval.

The weights can be initially set to the default value. Endpoint server metrics can then be collected during a time window. Depending on whether a non-proxy routing architecture (as in FIGS. 2-3) or a proxy routing architecture (as in FIG. 4) is used, these metrics can be included in performance reports sent from the endpoint servers 504A through 504C during the time window or derived by the node selector 110 directly during the time window. In either case, the node selector 110 can apply a statistical measure (e.g., an averaging) of the metrics of the control nodes (e.g., the endpoint servers 504A and 504B) to generate control metrics (e.g., an average latency histogram). The node selector 110 can then compare the control metrics to the metrics of the target node (e.g., the CSPT endpoint server 504C) to determine a difference (e.g., a variance in the latency histogram).

The node selector 110 can compare the difference to a threshold amount (which may be defined in the CSPT configuration). If smaller than the threshold amount, the latency of the CSPT endpoint server 504C is about the same as the other endpoint servers 504A and 504B. In this case, the node selector 110 can increase the weight of the CSPT endpoint server 504C relative to the endpoint servers 504A and 504B. This increase can be incremental. If larger than the threshold amount, the latency of the CSPT endpoint server 504C is significantly different from that of the other endpoint servers 504A and 504B. In this case, the node selector 110 can compare the latency of the latency of the CSPT endpoint server 504C to the maximum latency (or some other error configuration defined in the CSPT configuration). If smaller than the maximum latency, the maximum load that the CSPT endpoint server 504C can handle before violating the maximum latency has not been reach yet. Accordingly, the node selector 110 can also increase the value of the weight of the CSPT endpoint server 504C. This increase can also be incremental. Otherwise, the maximum load has been already reached (and corresponds to the previous load that the CSPT endpoint server 504C handled before the latest weight increase). In this case the node selector 110 decreases the weight of the CSPT endpoint server 504C. This decrease can be larger than the last increase (e.g., can be exponential, the value can be reset to the default, the value can be halved, etc.). The maximum load represents the maximum number of requests that the CSPT endpoint server 504C can handle during a time interval. In an example, this maximum load is expressed as a maximum TPS.

Although FIG. 5 describes providing a single service, an endpoint server can be configured to provide multiple services on behalf of different entities. For example, the endpoint server can be partitioned according to a multi-tenant architecture, where each partition supports a different service. Here, the CSPT can be granular to the partition level (e.g., per service) and/or for the entire endpoint server (e.g., the collection of services).

Figure 6:
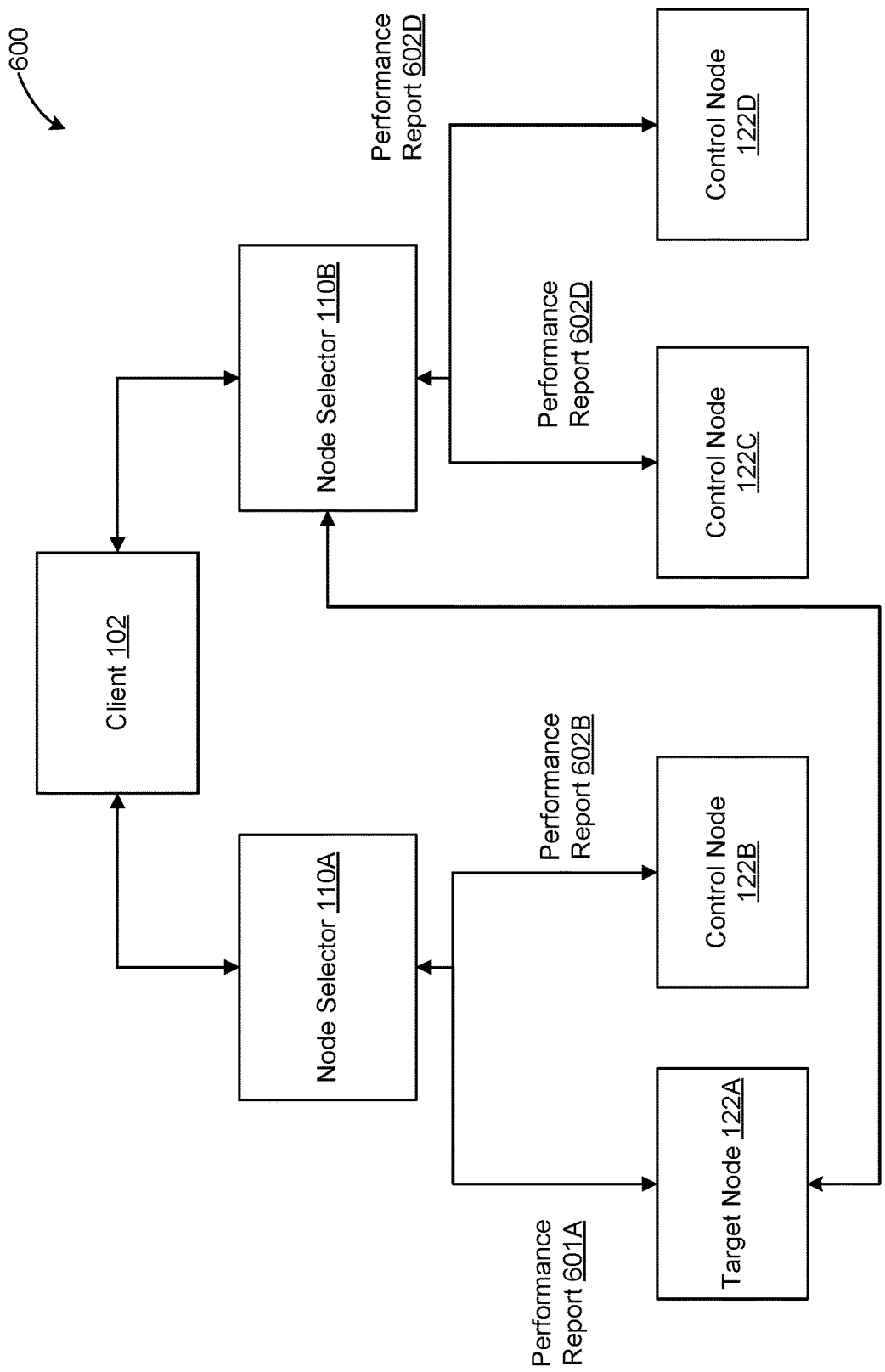
FIG. 6 illustrates a multiple node selector architecture in which a target node is shared between node selectors, but control nodes are not shared, according to an embodiment of the present disclosure.

FIG. 6 illustrates a multiple node selector architecture 600 in which a target node is shared between node selectors, but control nodes are not shared, according to an embodiment of the present disclosure. For simplicity of explanation, the architecture 600 is illustrated as including a client 102, two node selectors 110A and 110B, and four nodes 122A, 122B, 122C, and 122D. The nodes 122A through 122D can host a service. The client 102 can request the service, and client requests of the client and/or other clients can be routed by the node selectors 110A and 110B to the nodes 122A through 122D (according to a non-proxy or proxy routing technique). Here, the nodes 122A through 122D are of the same node type. Each node selector 110A and 110B can derive, on its own, a performance limit for providing the service when using the node type. To do so, the node selector 110A and the node selector 110B can coordinate (e.g., via a message exchange) the selection of a node as a target for CSPT. In FIG. 6, this target is the node 122A. The remaining nodes are set as control nodes.

Also in FIG. 6, the node selector 110A can distribute a load to the target node 122A and the control node 122B, but not to the control node 122C or the control node 122D. Conversely, the node selector 110B can distribute a load to the control node 122C and the control node 122D, but not to the target node 122A or the control node 122B.

The loads are distributed according to weights, as described herein in connection with FIG. 5. The weight of the target node 122A can be incrementally increased (or decreased upon determining a performance limit), whereas the weights of the control nodes 122B through 122D can remain the same. A performance report 601A of the target node 122A can be sent by the target node 122A to both node selectors 110A and 110B in the case of a non-proxy routing architecture or can be derived directly by the node selector 110A and sent from the node selector 110A to the node selector 110B. For each of the control nodes 122B through 122D, the relevant performance report 602B, 602C, or 602D is generated. For example, in the case of a non-proxy routing architecture, the control node 122B sends its performance report 602B to the node selector 110A, whereas each of the control nodes 122C and 122D sends its performance report 602C or 602D to the node selector 110B. In the case of a proxy routing architecture, the node selector 110A derives directly the performance report 602B of the control node 122B, whereas the node selector 110B derives directly the performance reports 602C and 602D of the control nodes 122C and 122D. In both cases, the node selector 110A can determine on its own a performance limit based on the performance report 601A and the performance report 602B. Likewise, the node selector 110B can determine on its own a performance limit based on the performance report 601A and the performance reports 602C and 602D.

Figure 7:
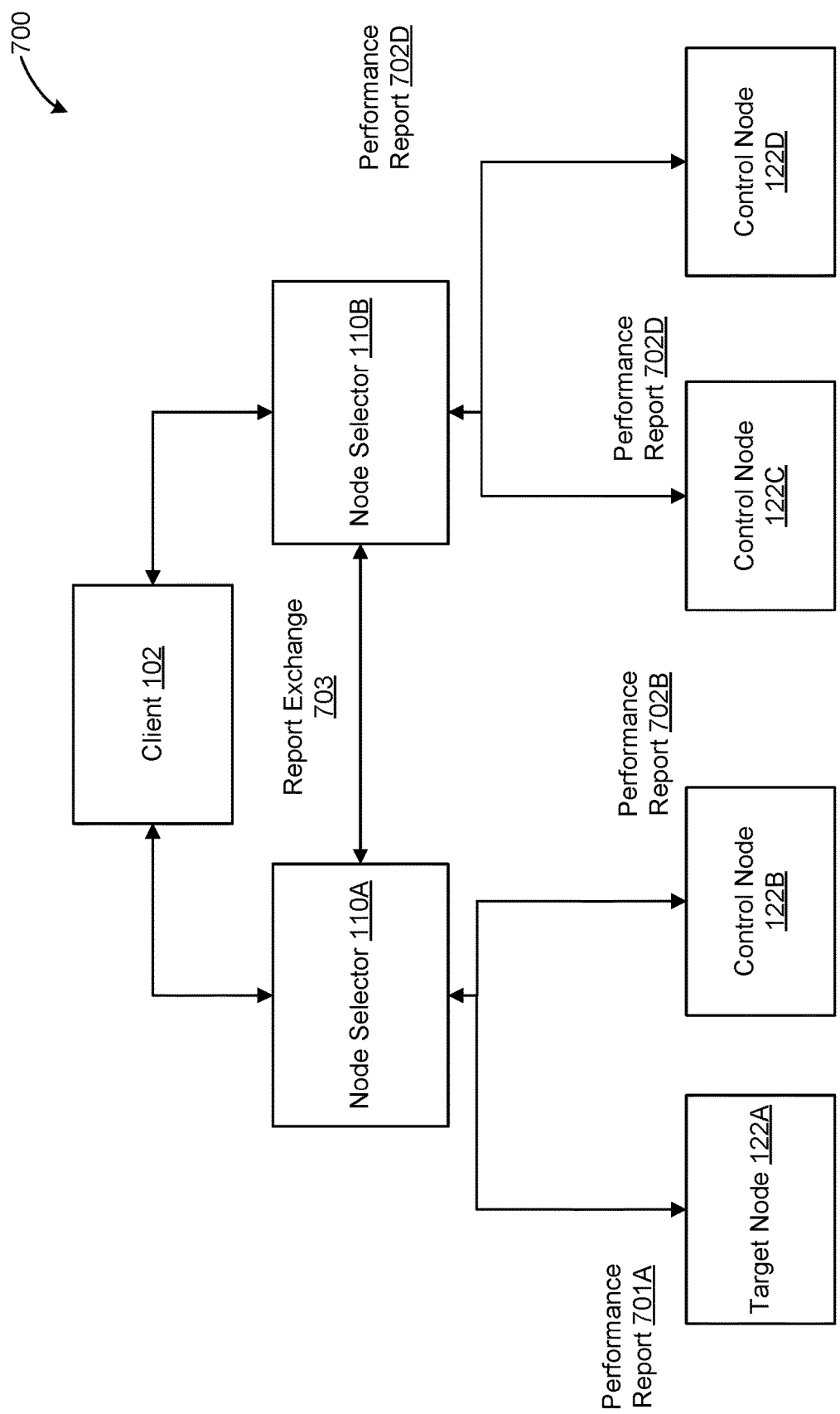
FIG. 7 illustrates a multiple node selector architecture in which a target node is shared between node selectors and control nodes are also shared, according to an embodiment of the present disclosure.

FIG. 7 illustrates a multiple node selector architecture 700 in which a target node is shared between node selectors and control nodes are also shared, according to an embodiment of the present disclosure. For simplicity of explanation, the architecture 700 is illustrated as including a client 102, two node selectors 110A and 110B, and four nodes 122A, 122B, 122C, and 122D. The nodes 122A through 122D can host a service. The client 102 can request the service, and client requests of the client and/or other clients can be routed by the node selectors 110A and 110B to the nodes 122A through 122D (according to a non-proxy or proxy routing technique). Here, the nodes 122A through 122D are of the same node type. Each node selector 110A and 110B can derive, on its own, a performance limit for providing the service when using the node type. However, this performance limit accounts for performance reports of control nodes managed by the other node selector (unlike the multiple node selector architecture 600 of FIG. 6). To do so, the node selector 110A and the node selector 110B can coordinate (e.g., via a message exchange) the selection of a node as a target for CSPT. In FIG. 7, this target is the node 122A. The remaining nodes are set as control nodes.

Also in FIG. 7, the node selector 110A can distribute a load to the target node 122A and the control node 122B, but not to the control node 122C or the control node 122D. Conversely, the node selector 110B can distribute a load to the control node 122C and the control node 122D, but not to the target node 122A or the control node 122B.

The loads are distributed according to weights, as described herein in connection with FIG. 5. The weight of the target node 122A can be incrementally increased (or decreased upon determining a performance limit), whereas the weights of the control nodes 122B through 122D can remain the same. A performance report 701A of the target node 122A can be sent by the target node 122A to both node selectors 110A and 110B in the case of a non-proxy routing architecture or can be derived directly by the node selector 110A and sent from the node selector 110A to the node selector 110B. For each of the control nodes 122B through 122D, the relevant performance report 702B, 702C, or 702D is generated. For example, in the case of a non-proxy routing architecture, the control node 122B sends its performance report 702B to the node selector 110A that in turn sends it to the node selector 110B as part of a report exchange 703. In comparison, each of the control nodes 122C and 122D sends its performance report 702C or 702D to the node selector 110B that hat in turn sends them to the node selector 110A as part of the report exchange 703. In the case of a proxy routing architecture, the node selector 110A derives directly the performance report 702B of the control node 122B and sends it to the node selector 110B as part of the report exchange 703, whereas the node selector 110B derives directly the performance reports 702C and 702D of the control nodes 122C and 122D and sends them to the node selector 110A as part of the report exchange 703. In both cases, the node selector 110A can determine on its own a performance limit based on the performance report 701A and the performance reports 702B through 702D. Likewise, the node selector 110B can determine on its own a performance limit based on the performance report 701A and the performance reports 702C through 702D.

In an example, the determination of both node selectors 110A and 110B can be redundant because the same reports are used. As such, it may be possible for one the two node selectors 110A or 110B to determine the performance limit and send it to the other node selector 110B or 110A via the report exchange 703.

Figure 8:
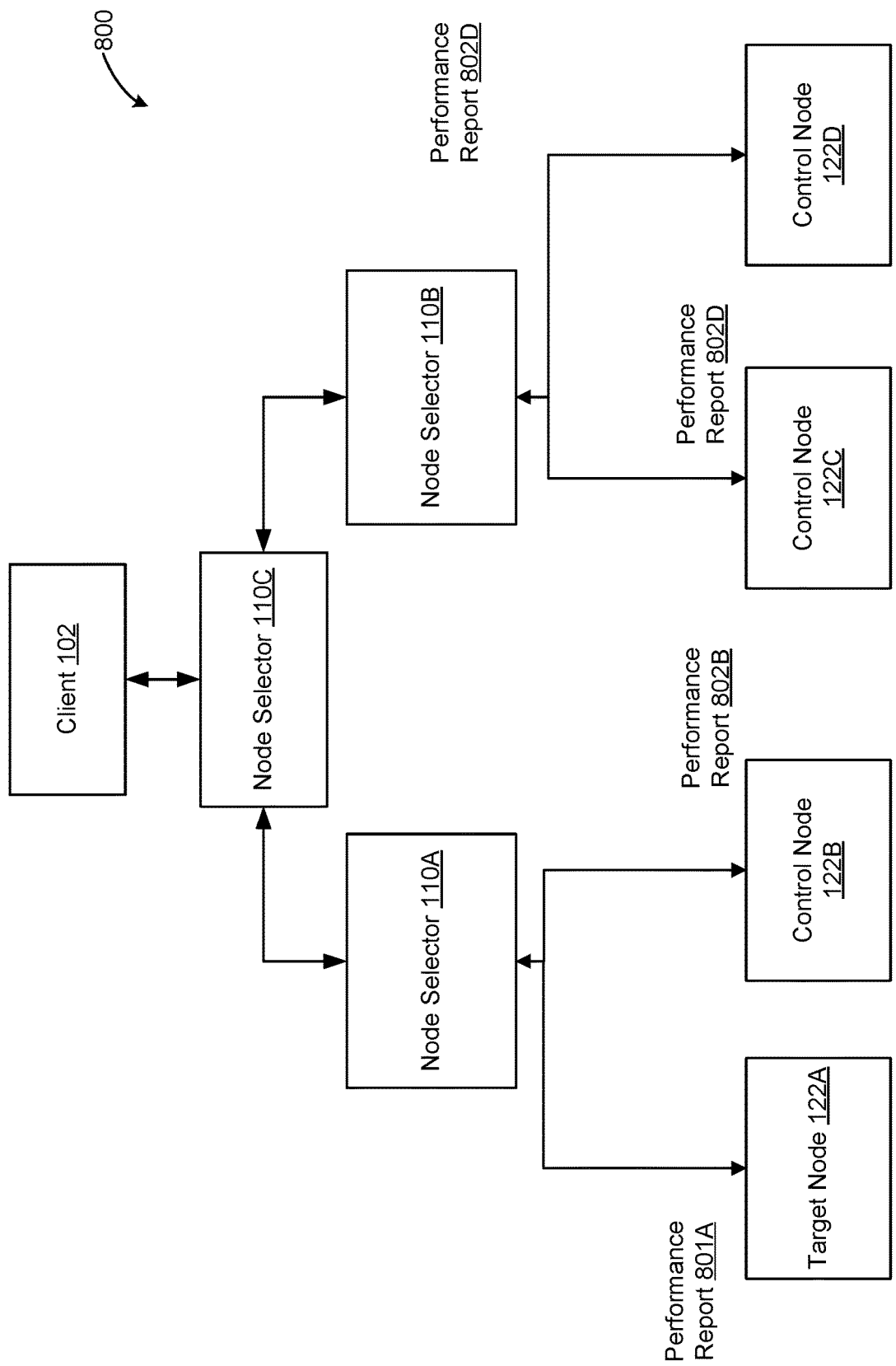
FIG. 8 illustrates a multiple node selector architecture that uses a hierarchy of node selectors, according to an embodiment of the present disclosure.

FIG. 8 illustrates a multiple node selector architecture 800 that uses a hierarchy of node selectors, according to an embodiment of the present disclosure. For simplicity of explanation, the architecture 800 is illustrated as including a client 102, three node selectors 110A, 110B, 110C, and four nodes 122A, 122B, 122C, and 122D. The nodes 122A through 122D can host a service. The client 102 can request the service, and client requests of the client and/or other clients can be received by the node selector 110C and routed to the node selectors 110A and 110B that then distribute them to the nodes 122A through 122D (according to a non-proxy or proxy routing technique). Here, the nodes 122A through 122D are of the same node type. The node selectors 110A through 110C are organized in a hierarchy that includes two levels. The top level includes the node selector 110C that serves as the main distributor of the client requests to the node selectors at the lower level. The lower level includes the node selectors 110A and 110B that distribute the client requests to the nodes 122A through 122D. Each node selector 110A and 110B can derive, on its own, a performance limit for providing the service when using the node type. This performance limit derived by a node selector of the lower level accounts for performance reports of control nodes managed by this node selector only (as in FIG. 6) or for also performance reports of the other node selector of the lower level (as in FIG. 7). To do so, the node selector 110C at the top level can select the node to use as a target for CSPT, can inform the node selectors 110A and 110B at the lower levels of the selection, and can optionally control the increase and decrease of the load of assigned to this target. In addition, upon a node selector of the lower level determining a performance limit, this performance limit can be reported to the node selector 110A that can then send it to the other node selector of the lower level. Additionally, or alternatively, the lower level node selectors 110A and 110B can report the determined performance reports to the top level node selector 110A that then determines the performance limit. As such, it may be possible to generate performance limits at different granularity levels. At the lower level, a performance limit can be generated per group of nodes served by a lower level node selector. At a higher level, a performance limit can be generated for all the nodes.

Figure 9:
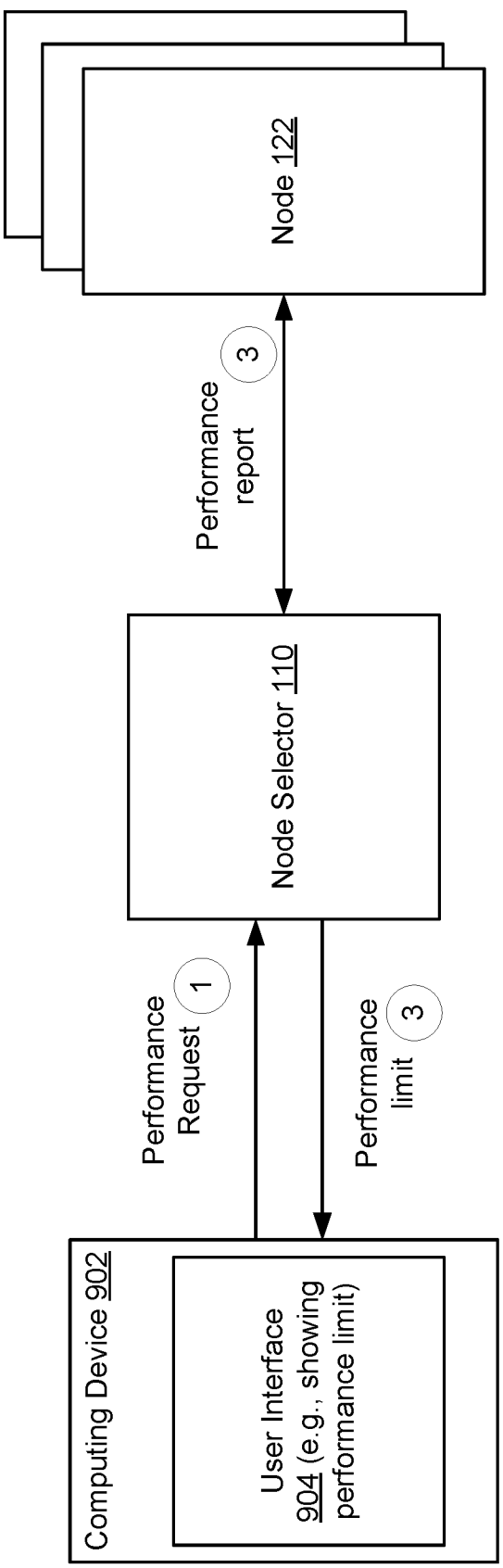
FIG. 9 illustrates an example of presenting a performance limit at a user interface of a computing device, according to an embodiment of the present disclosure.

FIG. 9 illustrates an example of presenting a performance limit at a user interface 904 of a computing device 902, according to an embodiment of the present disclosure. For simplicity of explanation, the computing device 902 is illustrated as sending a performance request to a node selector 110. The node selector 110 can be part of a computer system that includes other components, such as the configuration service 502, that may actually expose an interface to the computing device 902 for submitting such a request and receiving a response back. Such components can then direct the request to the node selector 110 and process the response to the node selector 110 to send the processing result to the computing device 902.

In an example, a set of requirements can be predefined without predefining the performance limits (e.g, in an SLA). The node selector 110 can determine the performance limit (e.g., by using CPST) based on performance reports of nodes 122 of the computer system. Upon receiving a performance request from the computing device, the node selector 110 can send the performance limit to the computing device 902. This performance limit can be presented in the user interface 904. Although this example corresponds to a pull mechanism, a push mechanism can be used. For example, the computing device 902 can be associated with a user account subscribed to an event. The event can correspond to a change to the performance limit. As such, anytime the node selector 110 determines a change to the performance limit, a notification can be sent to the computing device 902 (or more generally stored in the user account) to indicate the change and/or the latest performance limit. Generally, the effort on behalf of a user for predefining performance limits and design assumptions about such limits can be reduced or eliminated altogether. Instead, the computer system can support a user interface whereby a user may merely indicate a set of requirements, whereby the computer system on its own can determine in-real time and continuously the performance limits and send them to the computing device 902 for presentation thereat.

Figure 10:
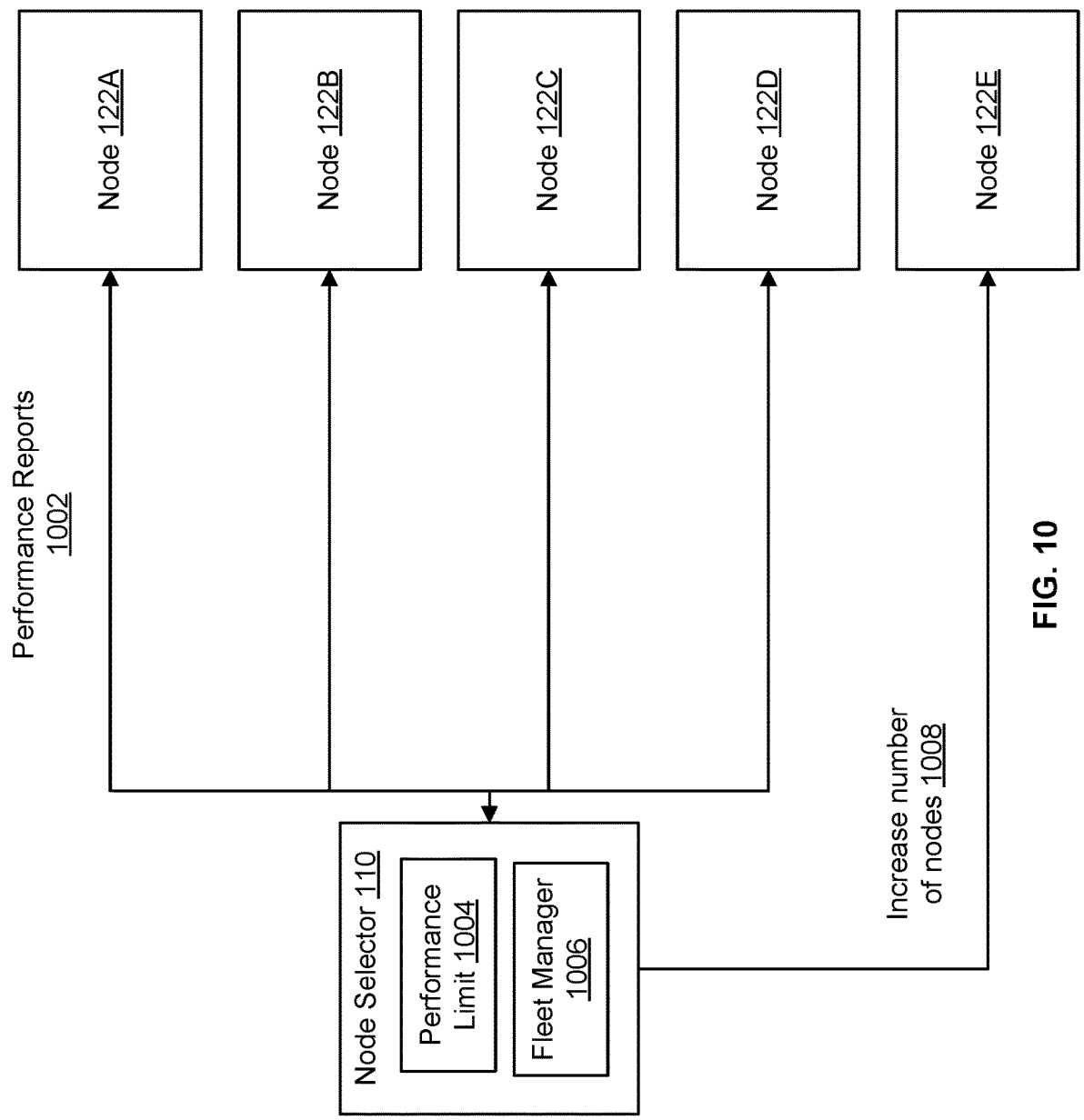
FIG. 10 illustrates an example of an action that can be triggered based on the performance limit determined for one or more nodes, according to an embodiment of the present disclosure.

FIG. 10 illustrates an example of an action that can be triggered based on the performance limit determined for one or more nodes, according to an embodiment of the present disclosure. Here, the action is to scale up the nodes deployed to provide a service. As illustrated in FIG. 10, a fleet of nodes 122A through 122D are communicatively coupled with a node selector 110. The node selector 110 can determine performance reports 1002 for the different nodes 122A through 122D to then derive a performance limit 1004, as described herein above. The node selector 110 (or some other component) can include a fleet manager 1006 that uses the performance limit 1004 to determine whether the fleet should be scaled up (by adding additional nodes thereto) or scaled down (by removing one or more nodes therefrom). In the case of a node being a virtualized node, adding the node includes instantiating the virtualized node, whereas removing the nodes includes terminating the execution of the underlying virtualization code. In the case of a node being a physical node, adding the node includes setting up a connection to establish a session with the physical node, whereas removing the node includes terminating the session.

The fleet manager 1006 can maintain a forecast of the load to be handled by the fleet and a requirement defined by the entity on behalf of which the service is provided. If the performance limit 1004 indicates that the forecasted load would not be handled without violating the requirement, the fleet manager 1006 determines that the fleet is to be increased. Conversely, If the performance limit 1004 indicates that the forecasted load could be handled with a lower number of nodes without violating the requirement, the fleet manager 1006 determines that the fleet is to be decreased. Otherwise, the fleet manager 1106 determines that the fleet should remain unchanged. The output of the fleet manager 1006 can be set as an indication: to increase (and possibly the number of nodes to be added), to decrease (and possibly the number of nodes to be removed), or to not change the size of the fleet. The output can trigger an action to then add or remove a node, as applicable. In FIG. 10, the action is to increase the number of nodes 1008.

To illustrate, consider an example of a maximum limit of 1,000 TPS and a requirement of a latency less than 0.5 seconds. The current fleet includes four nodes, each capable of handling up to 1,000 TPS, while meeting the 0.5 seconds latency requirement. Say that the forecast is for a total of 5,500 TPS. In this case, the fleet manager determines that the fleet is incapable of meeting this forecast. The triggered action can be to add two nodes of the same type as the existing ones, presuming that each would be able to handle 1,000 TPS. As a result, the fleet would then include six nodes, with a total capacity of 6,000 TPS, which would be well suited to handle the forecasted 5,500 TPS.

Figure 11:
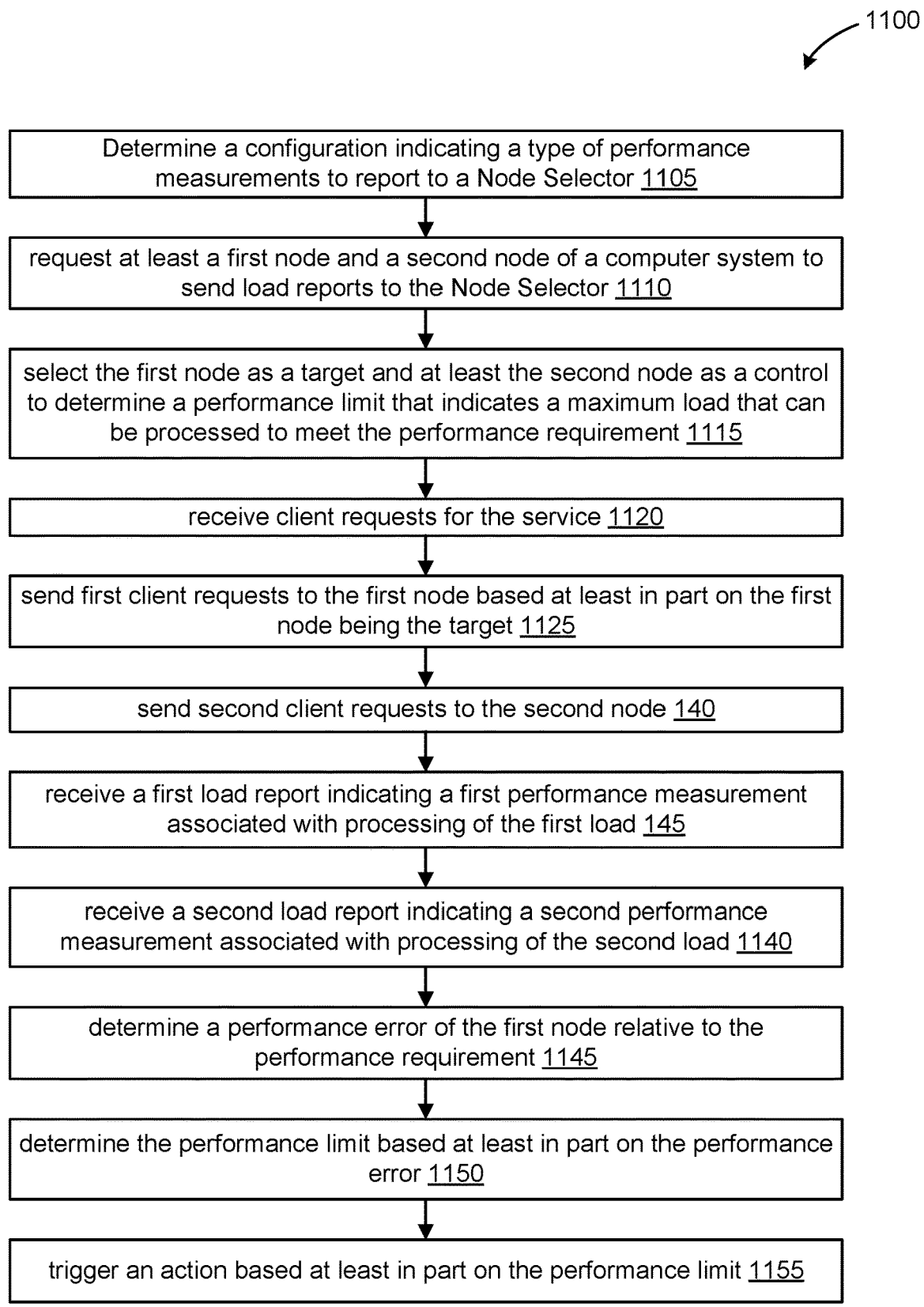
FIG. 11 illustrates an example flow for triggering an action based on a performance limit, according to an embodiment of the present disclosure.

FIG. 11 illustrates an example flow 1100 for triggering an action based on a performance limit, according to an embodiment of the present disclosure. Some or all of the operations of the flow (or any other operations described herein, or variations, and/or combinations thereof) may be performed under the control of one or more computer systems, such as one that includes one or more node selectors and one or more nodes, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium is non-transitory.

In an example, the flow 1100 includes operation 1105, where the computer system determines, based at least in part on a performance requirement associated with providing the service, a configuration indicating a type of performance measurements to report to a node selector 110. The configuration may include a performance requirement, for example determined based on an SLA between a first entity associated with a computing device and a second entity associated with the computer system. The performance requirement may include a specified (e.g., maximum) latency value for processing service requests, and the like, and the performance measurements may include TPS values, latency values, and the like relating to processing service requests.

In an example, the flow 1100 includes operation 1110, where the computer system requests, based at least in part on the configuration, at least a first node of the computer system and a second node of the computer system to send load reports to the node selector 110. The first node, the second node, or a combination thereof may be physical computer servers, virtual computer servers, or the like. The load reports may include data indicating performance measurements for the first node and/or the second node. For example, the load reports may include latency measurements of the first node and/or the second node over time intervals in the form of latency histograms.

In an example, the flow 1100 includes operation 1115, where the computer system selects the first node as a target node and at least the second node as a control node. In some embodiments, the computer system may select additional nodes, such as a third node, a fourth node, etc., to be additional control nodes. The computer system may determine that the first node and the second node are of a same type of node. Additionally, the first node and the second node may be selected based at least in part on the determined type of node. The computer system may use the control nodes and the target node(s) to determine a performance limit that indicates a maximum load of the computer system that can be processed to meet the performance requirement. The first node may be designated, for example by the computer system, to handle a larger load than the second node based at least in part on the first node being selected as the target and the second node being selected as the control.

In an example, the flow 1100 includes operation 1120, where the computer system receives client requests to perform a service. The service requests can be distributed to the nodes based on a non-proxy or a proxy routing architecture.

In an example, the flow 1100 includes operation 1125, where the computer system transmits first client requests to the first node based at least in part on the first node being the target node. The first client requests may include a first subset of the received service requests. In some embodiments, the node selector 110 of the computers system 120 may determine and route (according to a non-proxy or a proxy routing architecture) the first client requests to the first node based at least on the first node being the target node. This first client requests represent a first load. The amount of the first load can be controlled according to a weight allocated to the target node. This weight can be controllably changed in the search for the performance limit, where this search is performed in real-time and involves the processing of the received client requests.

In an example, the flow 1100 includes operation 1130, where the computer system transmits second client requests to the second node based at least on the second node being the control node. In some embodiments, the computer system transmits the second client requests to additional control nodes designated by the computer system. Additionally, the second client requests may correspond to a second load that is smaller than the first load. The amount of the second load can be controlled according to a weight allocated to the second node. This weight need not (but may) be changed in the search for the performance limit. The node selector 110 may transmit (according to a non-proxy or a proxy routing architecture) the second client requests to the second node. Of course, and referring back to both operations 1125 and 1130, additional client requests can be sent to the nodes at different time intervals.

In an example, the flow 1100 includes operation 1135, where the computer system receives, from the first node, a first load report indicating a first performance measurement associated with processing of the first load. The first node may process the first load, and the first load report may indicate the first performance of the first node processing the first load. In some embodiments, the first load report may indicate latencies experienced while the first node processed the first load and the like. The load report may be received by the node selector from the first node and/or can be derived by the node selector based on the first client requests sent to the first node and the responses thereto by the first node (e.g., in the case of a proxy routing architecture, the node selector).

In an example, the flow 1100 includes operation 1140, where the computer system receives, from the second node, a second load report indicating a second performance measurement associated with processing of the second load. The second node may process the second load, and the second load report may indicate the second performance of the second node processing the second load. In some embodiments, the second load report may indicate latencies experienced while the second node processed the second load and the like. Here also, the load report may be received by the node selector from the second node and/or can be derived by the node selector based on the second client requests sent to the second node and the responses thereto by the second node (e.g., in the case of a proxy routing architecture, the node selector). Similar load reports can be determined for other nodes.

In an example, the flow 1100 includes operation 1145, where the computer system determines, based at least in part on the first load report and the second load report (and, as applicable other reports), a performance error of the first node relative to the performance requirement. The performance error may include a variance between the first performance and the second performance (or a statistical measure applied to the determined performance reports).

In an example, the flow 1100 includes operation 1150, where the computer system determines the performance limit based at least in part on the performance error. In some embodiments, the performance limit may be or otherwise include a maximum TPS that can be handled by the first node or any node being of the same type as the first node. The performance limit can be determined by comparing the performance error to a predefined error (e.g., a threshold amount). If smaller than the predefined error, the flow can iteratively repeat by increasing the load of the first node (e.g., by controlling the allocated weight) to then determine the next load report and compare it with report(s) of the control node(s) until the performance error is determined to be larger than the predefined error.

In an example, the flow 1100 includes operation 1155, where the computer system triggers an action based at least in part on the performance limit. In some embodiments, the action includes adding a node to a fleet of nodes that includes the first node and the second node, limiting the load to be distributed to a node, sending an indication of the performance limit to a computing device, and the like.

Figure 12:
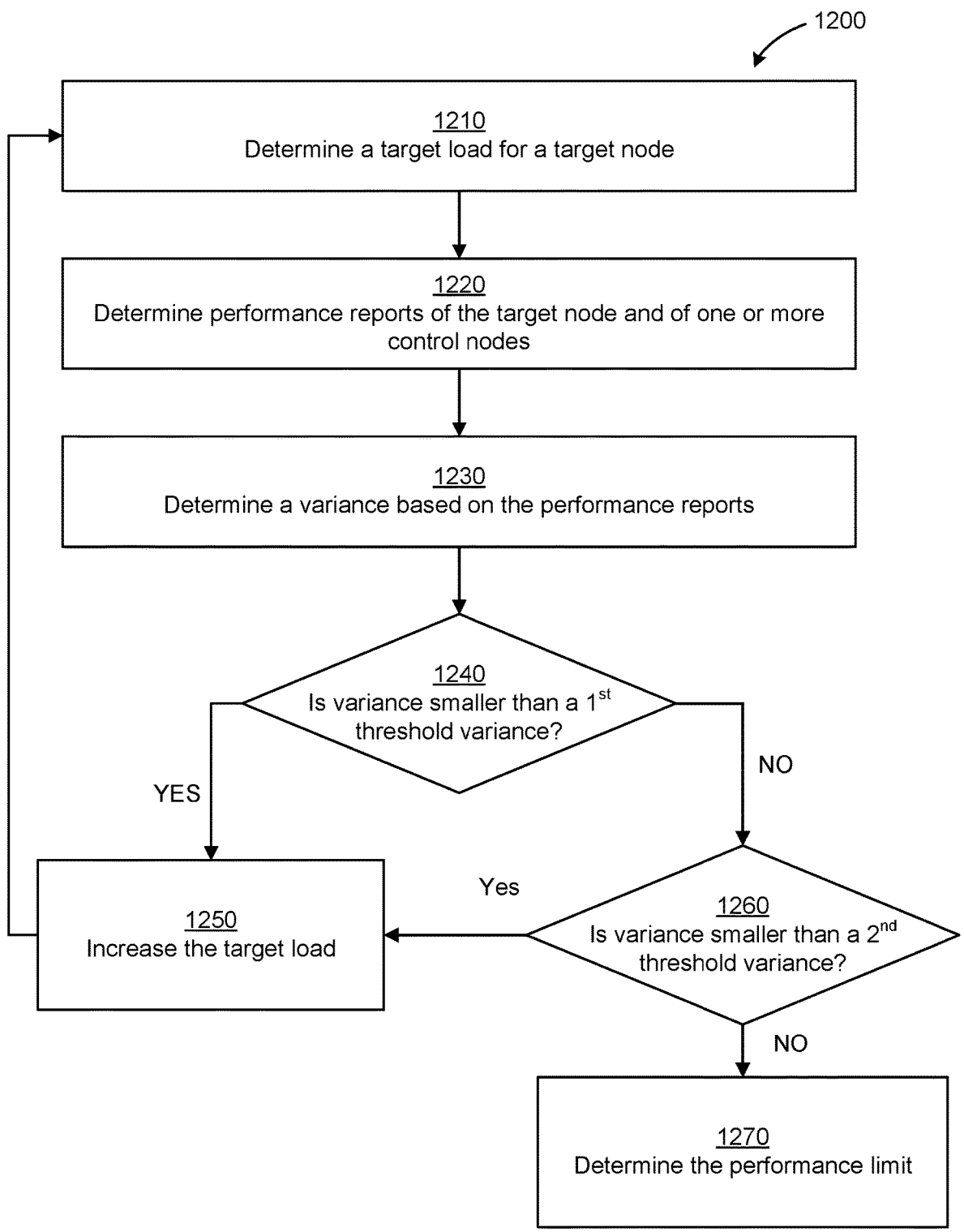
FIG. 12 illustrates an example flow for determining a performance limit, according to an embodiment of the present disclosure.

FIG. 12 illustrates an example flow 1200 for determining a performance limit, according to an embodiment of the present disclosure. Some or all of the operations of the flow 1200 can be implemented as sub-operations of the flow 1100 of FIG. 11 (e.g., as sub-operations of operations 1145-1150).

In an example, the flow 1200 includes operation 1210, where a node selector determines a target load for a target node. For example, the target node may be assigned a weight. Initially the weight may be set to a default value. Overtime, this value can be iteratively increased in the search for the performance limit, before being decreased. The target load may be determined based on the current value of the weight. For example, the current value can be mapped to a range of TPS that the target node should handle. Given a target load, a number of services requests can be distributed to the target node (e.g., this number falls in the TPS range).

In an example, the flow 1200 includes operation 1220, where the node selector determines performance reports of the target node and of one or more control nodes. The performance report of a node may include one or more latency measurements (e.g., a latency histogram) corresponding to requests (or, more generally, transactions) handled by the node during a time interval.

In an example, the flow 1200 includes operation 1230, where the node selector determines a variance based on the performance reports. For example, the node selector applies a statistical measure (e.g., an averaging) of the measurement reports of the one or more control nodes to generate a control measurement report. This control measurement report can be compared to the measurement report of the target node to compute the variance.

In an example, the flow 1200 includes operation 1240, where the node selector determines whether the variance is smaller than a first threshold variance. The first threshold variance may be predefined as an acceptable variance (e.g., an acceptable difference between the performance of the target node relative to the control nodes). The node selector can compare the determined variance to the first threshold variance. If the determined variance is smaller than the first threshold variance, the node selector proceeds to operation 1250. If the determined variance is not smaller than the first threshold variance, the node selector 110 proceeds to operation 1260.

In an example, the flow 1200 includes operation 1250, where the node selector increases the target load. Increasing the target load may involve increasing a value of the weight associated with the target node. The weights of the control nodes may remain unchanged. The flow 1200 may then loop back to operation 1210, whereby the next target load for the target node can be determined and service requests can be routed thereto accordingly.

In an example, the flow 1200 includes operation 1250, where the node selector determines whether the variance is smaller than a second threshold variance. The second threshold variance may be predefined as an acceptable performance error (e.g., a performance that does not violate a requirement). The node selector 110 can compare the determined variance to the second threshold variance. If the determined variance is smaller than the second threshold variance, the node selector proceeds to operation 1250. If the determined variance is not smaller than the second threshold variance, the node selector proceeds to operation 1270.

In an example, the flow 1200 includes operation 1270, where the node selector determines the performance limit. In this case, the performance limit can correspond to the last load (e.g., the TPS) that was handled by the target node before the variance became larger than the second threshold.

Figure 13:
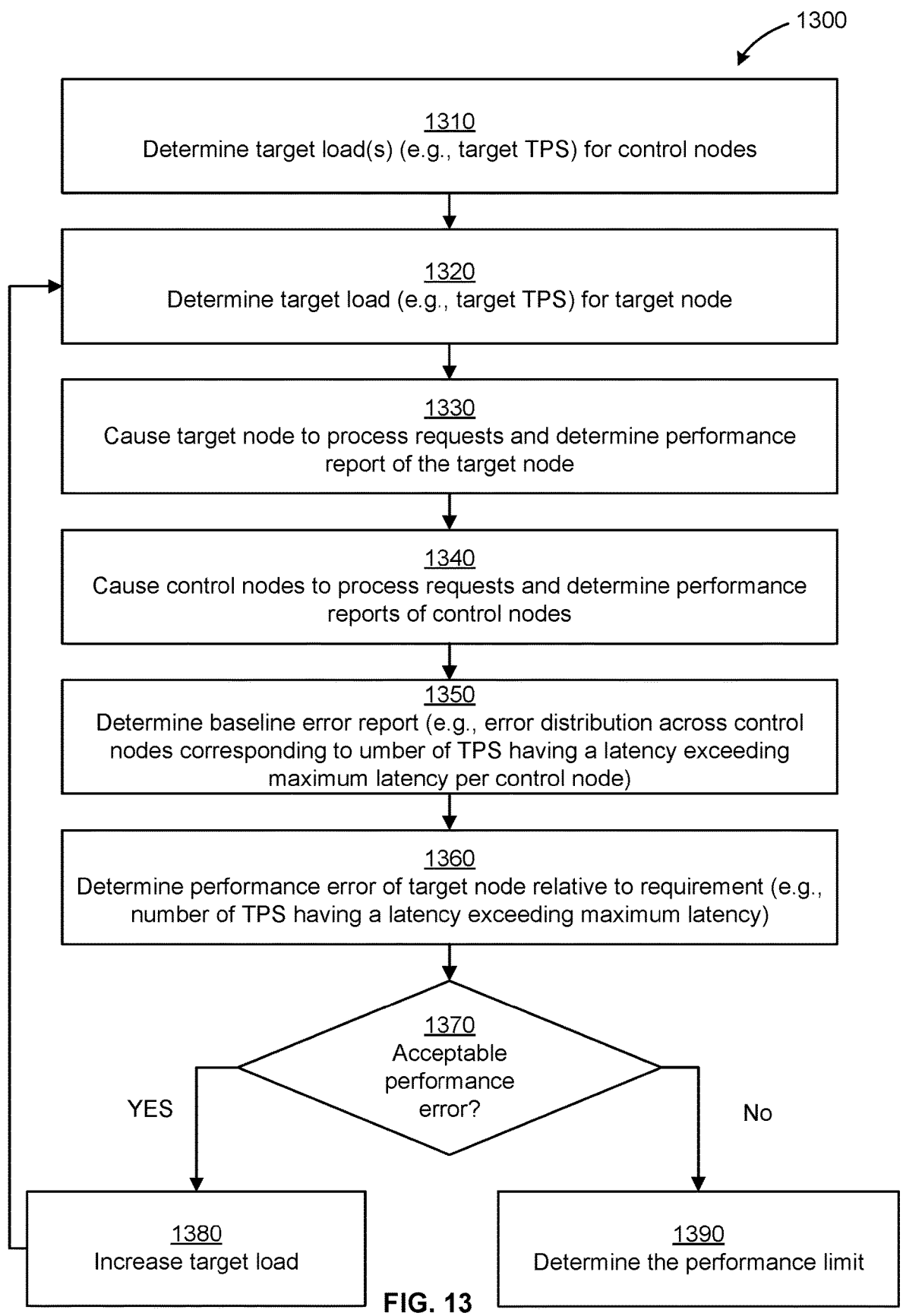
FIG. 13 illustrates another example flow for determining a performance limit, according to an embodiment of the present disclosure.

FIG. 13 illustrates another example flow 1300 for determining a performance limit, according to an embodiment of the present disclosure. Some or all of the operations of the flow 1300 can be implemented as sub-operations of the flow 1100 of FIG. 11 (e.g., as sub-operations of operations 1145-1150). In the interest of clarity of explanation, the flow 1300 is described in connection with particular performance measurements (e.g., latencies), performance limit (e.g., maximum TPS), and a predefined requirement (e.g., a maximum latency). However, the flow 300 can be similarly and equivalently be implemented for any types of performance measurements, performance limits, and/or requirements.

In an example, the flow 1300 includes operation 1310, where the node selector determines a target load(s) for control nodes. As described herein above, the same target load may be used for all control nodes and can be determined based on a value of a weight assigned to such nodes. The value can be a default value (e.g., a weight of "1.0") and/or can be mapped to a target number of requests that a node should process in a unit of time (e.g., "1,000 TPS") or to a target range of such numbers (e.g., between "1,000 and 1,500 TPS").

In an example, the flow 1300 includes operation 1320, where the node selector determines a target load for a target node. As described herein above, the target may be dynamically changed in the search for the performance limit. In particular, the target load can be iteratively increased until the performance limit is found to then possibly be decreased. In one example, a weight is used to control the target load. The value of the weight can be incrementally increased before being decreased. This value can also be mapped to a target number of requests that the target node should process in the unit of time or to a target range of such numbers (e.g., a value of "3.0" can be mapped to "3,000 TPS" or a range between "3,000 and 4,500 TPS").

In an example, the flow 1300 includes operation 1330, where the node selector causes the target node to process first requests and determines a performance report of the target node associated with processing the first requests. The first requests correspond to the target load determined for the target node. Depending on whether a proxy or a non-proxy architecture is used, the node selector routes or directs clients to send the first requests to the target node, where the total number of these first requests meets the target number or the target range assigned to the target node (e.g., the target node processes about 3,000 requests per second). In turn, and as applicable depending on the non-proxy or proxy architecture, the target node sends its performance report to the node selector, or the node selector generates the performance report based on responses of the target node. In both cases, the performance report can indicate, for each processed request, the latency associated with processing this request.

In an example, the flow 1300 includes operation 1340, where the node selector causes each control node to process second requests and determines a performance report of each control node associated with processing the second requests. The second requests correspond to the target load determined for the control node. Depending on whether a proxy or a non-proxy architecture is used, the node selector routes or directs clients to send the second requests to the control node, where the total number of these second requests meets the target number or target range assigned to the control node (e.g., the control node processes about 1,000 requests per second). In turn, and as applicable depending on the non-proxy or proxy architecture, the control node sends its performance report to the node selector, or the node selector generates the performance report based on responses of the control node. In both cases, the performance report of each control can indicate, for each request processed by the control node, the latency associated with processing this request.

In an example, the flow 1300 includes operation 1350, where the node selector determines a baseline error report. This baseline error report can be determined based on the performance reports of the control nodes and based on the requirement (e.g., the maximum latency). For example, for each control node, the node selector determines the total number of requests having a processing latency that exceeds the maximum latency. This total number corresponds (or the ratio of this number over the total number of requests that the control node handled) to errors in the sense that the processing took longer than the maximum latency. The node selector can generate a latency histogram showing the error distribution across the different control nodes. This latency histogram can also have a time dimension, whereby the error distribution can be tracked across the different control nodes over time. Accordingly, it may be possible to track the error per control node over time. Additionally, or alternatively, a statistical measure (e.g., averaging, a decay function, etc.) can be applied to the latency histograms over a rolling time window (e.g., the last minute) to maintain an updated latency histogram. Accordingly, it may be possible to track a statistical measure of the error per control node.

In an example, the flow 1300 includes operation 1360, where the node selector determines a performance error of the target node. This performance error can be determined based on the performance report of the control node and based on the requirement (e.g., the maximum latency). For example, the node selector determines the total number of requests that were processed by the target node and that had a processing latency exceeding the maximum latency. This total number corresponds to errors in the sense that the processing took longer than the maximum latency. The node selector can track this error (e.g., the total number of requests having a processing latency that exceeds the latency, or a ratio of such number over the total number of requests that were processed by the target node) over time or can apply a statistical measure (e.g., averaging, a decay function, etc.) to such error and other previously determined errors of the target node.

In an example, the flow 1300 includes operation 1370, where the node selector determines whether the performance error of the target node is acceptable or not. For instance, the node selector determines a variance of the performance error of the target node relative to the latency histogram. If the variance is smaller than a threshold amount, the performance error is acceptable and operation 1380 is performed. If the variance exceeds the threshold amount, the performance error is unacceptable and operation 1390 is performed. In an example, the threshold amount can be predefined. In another example, the threshold amount can depend on the latency histogram of the control nodes. In particular, the greater the variability of the error distribution across the control nodes (e.g., its deviation), the larger the threshold amount can be made. To illustrate, consider the following situations. In a first situation, the baseline error report indicates an average of ten requests that exceed the maximum latency, with a small standard deviation. In this situation, the threshold amount can be set to be twice the average. If the performance error indicates that the total number of maximum latency exceeding requests processed by the target node exceeded twenty, the performance error is unacceptable. Otherwise, it is acceptable. In another situation, the baseline error report indicates an average of ten requests that exceed the maximum latency, with a large standard deviation. In this situation, the threshold amount can be set to be five times the average. If the performance error indicates that the total number of maximum latency exceeding requests processed by the target node exceeded fifty, the performance error is unacceptable. Otherwise, it is acceptable In an example, the flow 1300 includes operation 1380, where the node selector increases the target load. For instance, the target load is increased by controlling the value of the weight assigned to the target node. This value can be increased according to a function. In one example, the function is a linear function. In another example, the function may depend on the performance error. For instance, the smaller the deviation is, the more aggressive the increase is (e.g., the larger the value becomes).

In an example, the flow 1300 includes operation 1390, where the node selector determines the performance limit. For instance, the performance limit corresponds to the latest TPS of the target node prior to its performance error becoming unacceptable.

Figure 14:
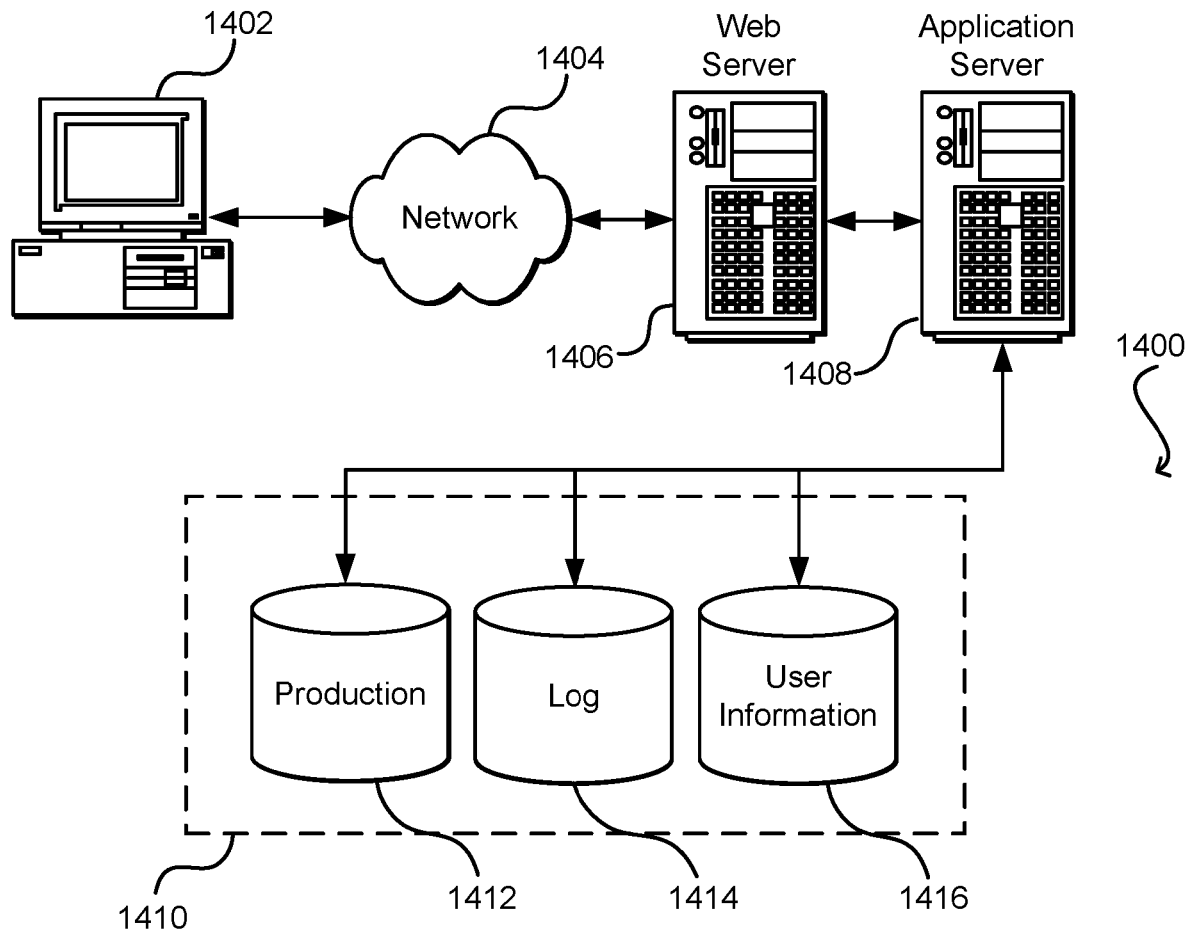
FIG. 14 illustrates aspects of an example environment for implementing aspects in accordance with various embodiments.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can correspond to any of the clients described herein above and can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes an application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the example environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN")

familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A system comprising:
 a computer system that includes a plurality of nodes and that is configured to provide a service; and
 a compute node coupled to the plurality of nodes and configured to:

determine, based at least in part on a performance requirement associated with providing the service, a configuration indicating a type of performance measurements to report to the compute node;

request, based at least in part on the configuration, at least a first node and a second node of the computer system to send load reports to the compute node;

select the first node as a target and at least the second node as a control to determine a performance limit that indicates a maximum load that can be processed within a unit of time while meeting the performance requirement, wherein the first node is to handle a larger load than the second node based at least in part on the first node being selected as the target and the second node being selected as the control;

receive a plurality of client requests for the service;

send first client requests of the plurality of client requests to the first node based at least in part on the first node being the target, the first client requests corresponding to a first load;

send second client requests of the plurality of client requests to the second node, the second client requests corresponding to a second load that is smaller than the first load;

receive, from the first node, a first load report indicating a first performance measurement associated with processing of the first load by the first node;

receive, from the second node, a second load report indicating a second performance measurement associated with processing of the second load by the second node;

determine, based at least in part on the first load report and the second load report, a performance error of the first node relative to the performance requirement;

determine the performance limit based at least in part on the performance error; and trigger an action based at least in part on the performance limit.

2. The system of claim 1, wherein the compute node is further configured to:

determine that the first node and the second node are of a same type of nodes, wherein the first node and the second node are selected based at least in part on the type of node; and send, to a device, an indication of the performance limit and an association of the performance limit to the type of node, wherein the action comprises sending the indication and the association.

3. The system of claim 1, wherein the compute node is further configured to:

send, to the second node, third client requests for the service, wherein the third client requests are sent during a different unit of time than the second client requests and correspond to a third load, wherein the action comprises limiting the third load based at least in part on the performance limit.

4. The system of claim 1, wherein the compute node is further configured to:

cause a third node to be added to the computer system, wherein the action comprises adding the third node; and send, to the third node, third client requests for the service, wherein the third client requests are sent during a different unit of time than the second client requests and correspond to a third load.

5. A computer-implemented method comprising:

selecting a first node of a plurality of nodes as a target and at least a second node of the plurality of nodes as a control to determine a performance limit associated with providing a service;

determining a first load for the first node based at least in part on the first node being selected as the target and a second load for the second node based at least in part on the second node being selected as the control;

causing the first node to process first requests for the service, the first requests corresponding to the first load;

causing the second node to process second requests for the service, the second requests corresponding to the second load;

receiving, from the first node, a first indication of a first performance measurement associated with processing of the first requests;

receiving, from the second node, a second indication of a second performance measurement associated with processing the second requests;

determining, based at least in part on the first performance measurement and the second performance measurement, a performance error of the first node;

determining the performance limit based at least in part on the performance error; and triggering an action based at least in part on the performance limit.

6. The computer-implemented method of claim 5, wherein the performance limit is a first performance limit determined during a first unit of time, and wherein the computer-implemented method further comprises:

determining a second performance limit during a second unit of time based at least in part on a third performance measurement associated with processing third requests for the service by the first node during the second unit of time and processing fourth requests for the service by the second node during the second unit of time, wherein the second performance limit is different from the first performance limit.

7. The computer-implemented method of claim 5, further comprising:

causing the first node to process a third load that is larger than the first load;

causing the second node to process a fourth load that is smaller than the third load;

determining a third performance measurement associated with processing of the third load by the first node;

determining a fourth performance measurement associated with processing of the fourth load by the second node; and determining, based at least in part on the third performance measurement and the fourth performance measurement, that the processing of the third load has no performance error.

8. The computer-implemented method of claim 7, further comprising:

causing the first node to process a fifth load that is larger than the third load;

causing the second node to process a sixth load that is smaller than the fifth load;

determining a fifth performance measurement associated with processing of the fifth load by the first node;

determining a sixth performance measurement associated with processing of the sixth load by the second node;

determining a performance variance based at least in part on the fifth performance measurement and the sixth performance measurement; and determining that the performance variance is smaller than a threshold.

9. The computer-implemented method of claim 7, further comprising:
causing the first node to process a fifth load that is larger than the third load;
causing the second node to process a sixth load that is smaller than the fifth load;
determining a fifth performance measurement associated with processing of the fifth load by the first node;
determining a sixth performance measurement associated with processing of the sixth load by the second node;
determining a performance variance based at least in part on the fifth performance measurement and the sixth performance measurement;
determining that the performance variance exceeds a threshold; and
determining the performance limit based at least in part on the performance variance.

10. The computer-implemented method of claim 9, further comprising:
causing the first node to process a seventh load that is smaller than the fifth load, wherein a load difference between the seventh load and the fifth load is larger than a load difference between the fifth load and the third load.

11. The computer-implemented method of claim 5, further comprising:
associating the first node with a first weight and the second node with a second weight that is different from the first weight;
causing the first node to process the first load based at least in part on the first weight; and
causing the second node to process the second load based at least in part on the second weight.

12. The computer-implemented method of claim 11, further comprising:
associating the first node with a third weight that is larger than the first weight;
causing the first node to process a third load based at least in part on the third weight;
causing the second node to process a fourth load based at least in part on the second weight;
determining a third performance measurement associated with processing of the third load by the first node;
determining a fourth performance measurement associated with processing of the fourth load by the second node;
determining a performance variance based at least in part on the third performance measurement and the fourth performance measurement; and
determining the performance limit based at least in part on the performance variance.

13. One or more computer-readable storage media storing instructions that, upon execution by one or more processors, cause the one or more processors to perform operations comprising:
selecting a first node of a plurality of nodes as a target and at least a second node of the plurality of nodes as a control to determine a performance limit associated with providing a service;
determining a first load for the first node based at least in part on the first node being selected as the target and a second load for the second node based at least in part on the second node being selected as the control;
causing the first node to process first requests for the service, the first requests corresponding to the first load;
causing the second node to process second requests for the service, the second requests corresponding to the second load;
receiving, from the first node, a first indication of a first performance measurement associated with processing the first requests for the service;
receiving, from the second node, a second indication of a second performance measurement associated with processing the second requests;
determining, based at least in part on the first performance measurement and the second performance measurement, a performance error of the first node;
determining the performance limit based at least in part on the performance error; and
triggering an action based at least in part on the performance limit.

14. The one or more computer-readable storage media of claim 13 storing further instructions that, upon execution by one or more processors, cause the one or more processors to perform further operations comprising:
sending, to a device, an indication of the performance limit, wherein the action comprising sending the indication.

15. The one or more computer-readable storage media of claim 14 storing additional instructions that, upon execution by one or more processors, cause the one or more processors to perform additional operations comprising:
receiving, from the device, an indication of a performance requirement associated with providing the service;
determining based at least in part on the performance requirement, a configuration indicating a type of performance measurements to be reported; and
requesting, based at least in part on the configuration, at least the first node and the second node to send performance measurements.

16. The one or more computer-readable storage media of claim 13 storing further instructions that, upon execution by one or more processors, cause the one or more processors to perform further operations comprising:
causing a third node to be added to the plurality of nodes, wherein the action comprises adding the third node; and
sending, to the third node, third requests for the service based at least in part on the performance limit, wherein the third requests are sent during a different unit of time than the first requests and the second requests and correspond to a third load.

17. The one or more computer-readable storage media of claim 13 storing further instructions that, upon execution by one or more processors, cause the one or more processors to perform further operations comprising:
indicating, to a client, that a request for the service is to be handled by the first node; and
receiving, from the first node, the first performance measurement.

18. The one or more computer-readable storage media of claim 13 storing further instructions that, upon execution by one or more processors, cause the one or more processors to perform further operations comprising:
sending a request of a client for the service to the first node;
receiving, from the first node, an output of processing the request by the first node;
sending the output to the client; and determining the first performance measurement based at least in part on the output.

19. The one or more computer-readable storage media of claim 13, wherein the one or more processors correspond to a first compute node, and wherein the one or more computer-readable storage media store further instructions that, upon execution by one or more processors, cause the one or more processors to perform further operations comprising:
   indicating, to a second compute node, that the first node is selected as the target; and
   forgoing sending at least the second performance measurement to the second compute node.

20. The one or more computer-readable storage media of claim 13, wherein the one or more processors correspond to a first compute node, and wherein the one or more computer-readable storage media store further instructions that, upon execution by one or more processors, cause the one or more processors to perform further operations comprising:
   indicating, to a second compute node, that the first node is selected as the target; and
   sending at least the second performance measurement to the second compute node.

* * * * *